(12) United States Patent
Teague

(10) Patent No.: US 10,234,862 B2
(45) Date of Patent: Mar. 19, 2019

(54) WWAN RADIO LINK QUALITY NAVIGATION FOR A DRONE

(71) Applicant: QUALCOMM Incorporated, San Diego, CA (US)

(72) Inventor: Edward Harrison Teague, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 45 days.

(21) Appl. No.: 15/383,396

(22) Filed: Dec. 19, 2016

(65) Prior Publication Data

US 2018/0017973 A1   Jan. 18, 2018

Related U.S. Application Data

(60) Provisional application No. 62/362,826, filed on Jul. 15, 2016.

(51) Int. Cl.

| | |
|---|---|
| *G06F 17/00* | (2006.01) |
| *G05D 1/00* | (2006.01) |
| *B64C 39/02* | (2006.01) |
| *G08G 5/00* | (2006.01) |
| *H04W 24/08* | (2009.01) |
| *H04W 4/029* | (2018.01) |
| *H04W 4/44* | (2018.01) |

(52) U.S. Cl.
CPC ......... *G05D 1/0088* (2013.01); *B64C 39/024* (2013.01); *G05D 1/0005* (2013.01); *G05D 1/0022* (2013.01); *G08G 5/0069* (2013.01); *H04W 4/029* (2018.02); *H04W 4/44* (2018.02); *H04W 24/08* (2013.01)

(58) Field of Classification Search
CPC .. G05D 1/0088; G05D 1/0022; B64C 39/024; G08G 5/0069; H04W 24/08
USPC .......... 701/3, 450, 532; 455/423, 422.1, 446
See application file for complete search history.

(56) References Cited

U.S. PATENT DOCUMENTS

| | | |
|---|---|---|
| 6,792,363 B1 | 9/2004 | Bye |
| 7,512,462 B2 | 3/2009 | Nichols et al. |

(Continued)

FOREIGN PATENT DOCUMENTS

| | | |
|---|---|---|
| JP | 2004260769 A | 9/2004 |
| WO | 2016069598 A1 | 5/2016 |

OTHER PUBLICATIONS

International Search Report and Written Opinion—PCT/US2017/034222—ISA/EPO—dated Jul. 18, 2017.

*Primary Examiner* — Shardul D Patel
(74) *Attorney, Agent, or Firm* — The Marbury Law Group, PLLC

(57) ABSTRACT

Various embodiments include methods of navigating a drone that may include determining whether a radio link quality trigger event associated with communications with the drone has occurred while the drone travels along a set route to a destination. The radio link quality trigger event may correspond to predetermined characteristics of radio link quality. The drone may be steered to follow a search maneuver for improving radio link quality in response to determining the radio link quality trigger event has occurred. The search maneuver may follow a preconfigured deviation pattern that is configured before determining whether the radio link quality trigger event has occurred and departs from the set route.

30 Claims, 9 Drawing Sheets

(56) References Cited

U.S. PATENT DOCUMENTS

| | | |
|---|---|---|
| 7,729,817 B2 | 6/2010 | Duranti et al. |
| 8,798,922 B2 * | 8/2014 | Tillotson ................. G05D 1/101 |
| | | 701/3 |
| 2007/0063834 A1 | 3/2007 | Bozzone et al. |
| 2010/0241759 A1 * | 9/2010 | Smith ...................... H04L 47/10 |
| | | 709/233 |
| 2014/0166816 A1 * | 6/2014 | Levien .................. B64C 39/024 |
| | | 244/175 |
| 2014/0226584 A1 * | 8/2014 | Cullen ................ H04B 7/18508 |
| | | 370/329 |
| 2015/0120094 A1 | 4/2015 | Kimchi et al. |
| 2015/0197010 A1 | 7/2015 | Ruuspakka et al. |
| 2016/0070265 A1 * | 3/2016 | Liu ....................... B64C 39/024 |
| | | 701/3 |
| 2016/0225264 A1 | 8/2016 | Taveira |
| 2016/0240091 A1 | 8/2016 | Thiele et al. |
| 2017/0012697 A1 * | 1/2017 | Gong .................... H04W 40/02 |
| 2017/0168480 A1 * | 6/2017 | Wanstedt .............. B64C 39/024 |

\* cited by examiner

WWAN RADIO LINK QUALITY NAVIGATION FOR A DRONE

RELATED APPLICATIONS

This application claims the benefit of priority to U.S. Provisional Patent Application 62/362,826 entitled "WWAN Radio Link Quality Navigation for an Unmanned Aerial Vehicle," filed Jul. 15, 2016, the entire contents of which are incorporated herein by reference.

BACKGROUND

Unmanned autonomous vehicles (UAVs), or drones, may use wireless wide area network (WWAN) communications for many facets of operation at low altitudes. Thus, the availability and reliability of network connectivity may be important for safe drone operation. Further, since drones can operate almost anywhere (without restriction of roads, for example) and at many different altitudes, it is challenging to design a network that provides the required network performance at all locations a drone might operate.

SUMMARY

Various embodiments include methods of navigating a drone. Various embodiments may include determining whether a radio link quality trigger event associated with communications with the drone has occurred while the drone travels along a set route to a destination. The radio link quality trigger event may correspond to predetermined characteristics of radio link quality. Various embodiments may include steering the drone to follow a search maneuver for improving radio link quality in response to determining the radio link quality trigger event has occurred. The search maneuver may follow a preconfigured deviation pattern that is configured before determining whether the radio link quality trigger event has occurred and departs from the set route.

In some embodiments, the search maneuver may be determined independent of radio link quality information. In some embodiments, the search maneuver may not be configured to direct the drone to a known location. In some embodiments, the preconfigured deviation pattern may include at least one movement characteristic selected from patterns that include at least one of a spiral, a geometric shape, a change in elevation, maintaining a fixed elevation, movement at least partially in a direction of the set route, and a combination thereof. In some embodiments, the preconfigured deviation pattern may constrain the drone to a region in which WWAN communications are expected to meet a minimum standard of radio link quality.

Some embodiments may include determining whether any search maneuver is assigned for immediate use by the drone and determining a set of movements for use as the search maneuver in response to determining no search maneuver is assigned for immediate use, in which steering the drone to follow the search maneuver uses the determined set of movements. Some embodiments may include determining whether a set of movements are assigned for immediate use by the drone as the search maneuver, in which steering the drone to follow the search maneuver using the assigned set of movements is performed in response to determining that the set of movements are assigned for immediate use by the drone.

In some embodiments, the search maneuver may include a modified version of the preconfigured deviation pattern that takes into account at least one of a size of an initial cycle of the preconfigured deviation pattern, a change in the size of the initial cycle for one or more subsequent cycles of the preconfigured deviation pattern, a change in a movement characteristic of the preconfigured deviation pattern, avoidance of an object or obstacle, navigational restrictions, or an available power level of the drone. In some embodiments, the search maneuver may include a modified version of the preconfigured deviation pattern that takes into account a detected radio link obstruction interfering with a radio link quality of communications with the drone, in which the modified version of the preconfigured deviation pattern is directed away from the detected radio link obstruction.

In some embodiments, the radio link quality trigger event may occur in response to a measure of radio link quality of communications with the drone dropping below a radio link quality threshold. In some embodiments, the radio link quality trigger event may occur further in response to the measure of radio link quality remaining below the radio link quality threshold longer than a low quality timeout threshold. In some embodiments, the radio link quality trigger event may occur in response to a measure of radio link quality of communications with the drone indicating a radio link failure longer than a radio link failure timeout threshold. In some embodiments, the radio link quality trigger event may occur in response to a radio link quality deterioration rate exceeding a deterioration rate threshold.

Some embodiments may include determining whether a detected pilot signal can be demodulated in response to steering the drone to follow the determined search maneuver. Some embodiments may include determining whether a predetermined data transfer rate is available for a detected pilot signal in response to steering the drone to follow the determined search maneuver.

Various embodiments may include obtaining radio link quality data corresponding to a region in which wide area network (WWAN) communications are available, determining a set route for reaching a destination using the obtained radio link quality data that will result in the drone passing through the region in which WWAN communications can be maintained, and steering the drone to follow the determined set route.

In some embodiments, determining the set route may include constraining the drone to the region in which WWAN communications are expected to meet a minimum standard of radio link quality. In some embodiments, determining the set route may include using the obtained radio link quality data to plot a set route that provides a defined minimum likelihood that WWAN communications will be maintained while traversing the set route.

Some embodiments may include measuring a radio link quality of WWAN communications at a location of the drone, and transmitting a radio link quality report including the measured radio link quality to a remote computing device. The operations of measuring the radio link quality of WWAN communications and the transmitting of the radio link quality report may be periodically repeated enroute to the destination.

Some embodiments may include determining whether the measured radio link quality equals or exceeds a designated minimum quality value, and transmitting the radio link quality report may be performed in response to determining that the measured radio link quality equals or exceeds the designated minimum quality value. In some embodiments, obtaining radio link quality data may include obtaining the radio link quality data from at least one other drone that previously occupied a particular location or volumetric region.

Some embodiments may include detecting a radio link failure enroute to the destination, and steering the drone based on the obtained radio link quality data to reestablish WWAN communications. In some embodiments, steering the drone to reestablish WWAN communications may include performing a random pattern to search for connectivity.

Further embodiments may include a drone including a wireless transceiver and a processor configured to perform operations of the methods summarized above. Further embodiments may include means for performing functions of the methods summarized above. Further embodiments may include a non-transitory processor-readable storage medium having stored thereon processor-executable instructions configured to cause a processor of the drone to perform operations of the methods summarized above.

BRIEF DESCRIPTION OF THE DRAWINGS

The accompanying drawings, which are incorporated herein and constitute part of this specification, illustrate exemplary embodiments of the claims, and together with the general description and the detailed description given herein, serve to explain the features of the claims.

DETAILED DESCRIPTION

Figure 1:
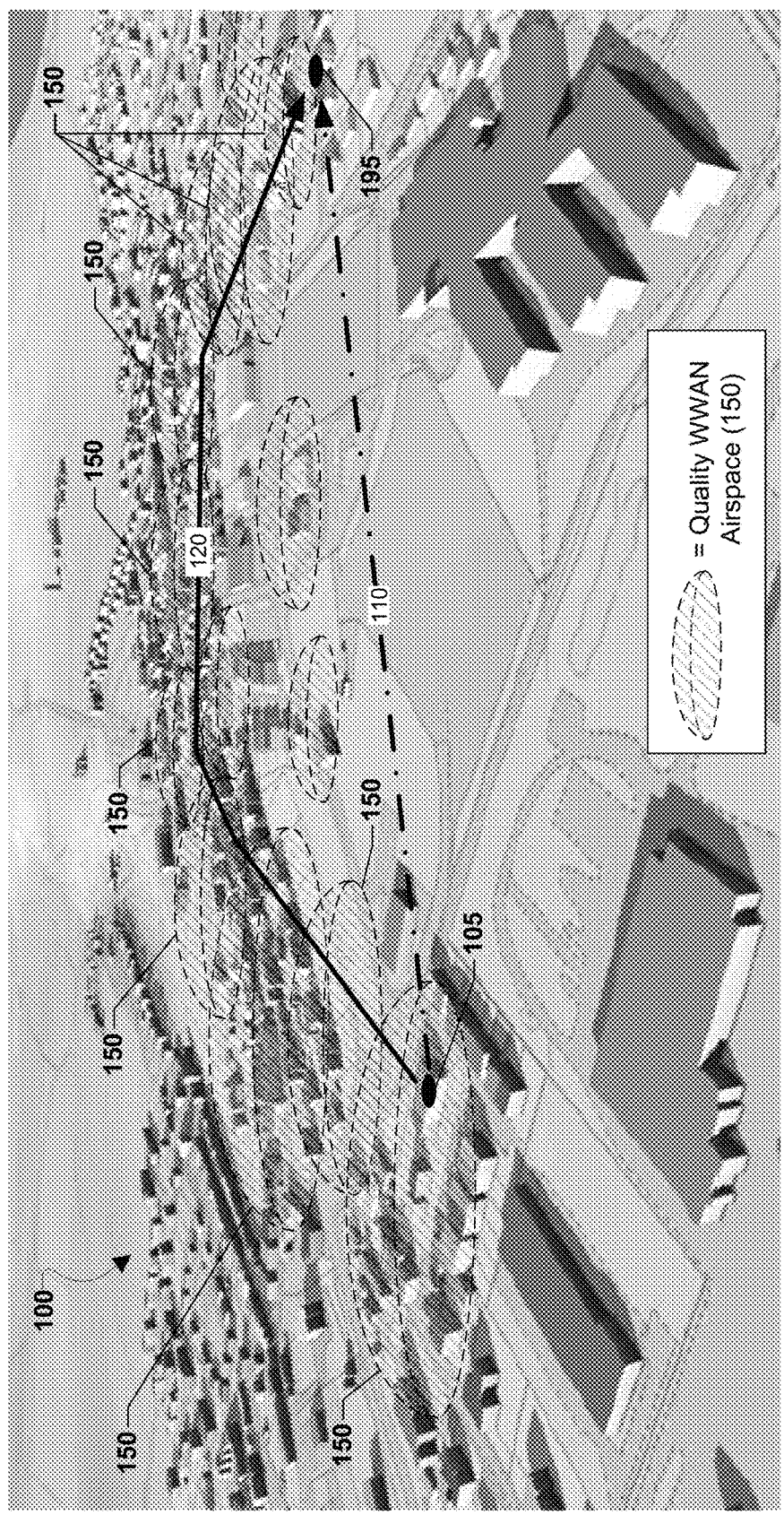
FIG. 1 is a perspective view of an environment including various quality WWAN regions for use in various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include methods implemented within a drone to enable the drone to attempt to maintain wireless wide area (WWAN) network communications to and from the drone while enroute to a destination by obtaining radio link quality data that may be used to plan a route to the destination. The radio link quality data may provide information corresponding to one or more regions in which WWAN communications are available for use by the drone while traveling to the destination. The drone may use the obtained radio link quality data to determine a route for reaching a destination and steer the drone to follow the determined route. When the radio link quality drops below an acceptable level while the drone is enroute to a destination, the drone may initiate radio link search maneuvers to regain communications or improve the radio link quality level. The radio link search maneuvers may include movements that follow one or more preconfigured deviation patterns from a set route of the drone. The preconfigured deviation patterns may be designed to provide a likelihood that radio link quality levels of communication with the drone will increase. The radio link search maneuver may take into account obstructions, weather, navigational restrictions, available power, and other considerations. The preconfigured deviation patterns may be other than simply reversing course or retracing a recent path of travel.

As used herein, the term "drone" refers to one of various types of autonomous or semi-autonomous vehicles (e.g., aircraft, land vehicles, waterborne vehicles, or a combination thereof) that may operate without onboard human pilots/drivers. A drone may include an onboard computing device configured to fly and/or operate the drone without remote operating instructions (i.e., autonomously), such as from a human operator or remote computing device. Alternatively or additionally, the computing device onboard the drone may be configured to receive operating instructions and/or updates to instructions from a remote computing device via communications. A drone may be propelled for flight and/or other movement in any of a number of known ways. For example, a plurality of propulsion units, each including one or more rotors, may provide propulsion or lifting forces for the drone and any payload carried by the drone. In addition or alternatively, the drone may include wheels, tank-treads, or other non-aerial movement mechanisms to enable movement on the ground, over water, under water, or a combination thereof. Further, the drone may be powered by one or more types of power source, such as electrical, chemical, electro-chemical, or other power reserve, which may power the propulsion units, the onboard computing device, and/or other onboard components.

As used herein, the expression "radio link" refers to a wireless data communication connection established via radio frequency signaling, such as through WWAN communications. A radio link enables communications (i.e., transfer of information and commands) between a drone and a ground system, which may include a computing device. Also as used herein, the expression "radio link quality" refers to a distinct attribute or characteristic of a radio link, such as a data exchange rate, error rate, a measure of interference, signal strength, or the like.

Certain navigational systems, such aviation systems, may have regulatory requirements for network availability, including transmitting and/or receiving certain types of information, such as telemetry reports and/or ground control instructions. The telemetry reports may provide measurements and other data collected by a drone to a remote computer, such as at a ground control station. Also, the ground control station may send to the drone urgent operational and/or navigational instructions so that the drone may respond to unforeseen situations and react for the safety of the drone. Meeting such regulatory network availability requirements may be challenging for drones that may operate at altitudes up to 400 feet, and travel in areas including buildings, canyons, and/or other obstructions. Obstructions from and/or a lack of proximity to communication nodes while enroute to a destination may cause radio link quality of communications with the drone to drop. The radio link quality may drop so low that communications with the drone are lost (i.e., a radio link cannot be made) or become unreliable (e.g., bit error rates exceed the compensating capacity of error correction measures within the communication link). In some instances the radio link quality may drop below acceptable levels for certain types of communications, particularly for applications that require high bandwidths (e.g., video transmission).

The regulatory network availability requirements may designate a percentage of a volume of a region (e.g., airspace) in which a drone operates that must provide or is likely to provide network connectivity for communicating critical and/or safety information to or from the drone. The network connectivity may be only periodically required. For example, the drone may only need to communicate with the network within a certain period (e.g., every 10 minutes), which means the drone may need to follow a route that includes and/or steers the drone toward the region in which the required communications are likely to occur. The designated percentage of the volume of the region in which the drone operates may be allowed, by the regulatory requirements, to provide limited network connectivity.

If a drone is allowed to navigate and move toward a destination without consideration for connectivity with a WWAN communication network, the drone may naturally take a shortest route or a route based on other considerations (e.g., power conservation, avoiding populated areas, etc.). However, while traversing routes selected without considering the ability to connect with a WWAN communication network, the drone could experience a drop in network connectivity (i.e., a reduction in radio link quality) below acceptable levels.

To address this problem, various embodiments restrict a drone's navigational path to routes that are known, or at least likely, to have better network availability. A processor of either the drone, or a remote computing device in communication with the drone, may determine a set route designed to optimize availability of WWAN communications, along with other factors configured to jointly ensure that availability requirements are met, while enroute to a destination. Thus, various embodiments enable a drone to operate within a portion of the region where network communications (and thus communications with a ground control system) are available and satisfy some minimum link quality requirements.

Whether or not a drone is following a route expected to have good network availability, occasionally the drone may encounter limited or no network connectivity. The drone may detect such conditions from a reduced radio link quality, including a complete loss of the radio link, and/or other conditions. Thus, in accordance with various embodiments, a processor of the drone may monitor radio link quality in order to detect one or more unsatisfactory conditions, referred to as "radio link quality trigger events." In response to determining that a radio link quality trigger event has occurred, the drone may initiate a search maneuver for improving radio link quality. The drone may use a default/preset search maneuver, select from more than one predetermined search maneuvers, generate a new search maneuver, or some combination thereof.

In various embodiments, search maneuvers may be defined by a series of commands executable by a processor of the drone and configured to control movements of the drone to search for better radio link quality. Each search maneuver may include a set of movements or maneuvers that follow a preconfigured deviation pattern intended to systematically and efficiently search for improved radio link quality as compared to the radio link quality measured along the current set route. Search maneuvers may include more than one preconfigured deviation pattern, and different search maneuvers may include one or more different preconfigured deviation patterns from one another. As used herein, the expression "preconfigured deviation pattern" refers to drone movements or maneuvers that are configured in advance to cause a drone to depart from a set route, along a path that has a discernible coherent form. Since the preconfigured deviation patterns are configured in advance, the preconfigured deviation patterns are determined independent of radio link quality conditions. The preconfigured deviation pattern may repeat upon completion of a cycle of the discernible coherent form.

FIG. 1 illustrates a perspective view of an environment 100 in which a drone may operate, including various locations where wireless communication links of sufficient quality (referred to herein as "quality WWAN regions" 150) that may be considered when determining a set route over a city in accordance with various embodiments. The quality WWAN regions 150 represent volumetric areas of space (e.g., airspace) in which WWAN communication signals can be transmitted and received by a drone to support network connectivity compliant with a minimum standard or mission/regulatory requirement. The quality of wireless communications within the quality WWAN regions 150 may depend upon many factors, including sources of interference (e.g., radar sites and television transmission towers), intervening structures (e.g., buildings), and distance to a ground station.

The quality WWAN regions 150 are illustrated in FIG. 1 as dome-shaped semi-spherical regions for illustrative purposes but may be other shapes depending upon the ground station transmission and reception characteristics and the surrounding environment. In addition, individual ones of the quality WWAN regions 150 may have varying levels of WWAN communication connectivity. Thus, the radio link quality levels of various quality WWAN regions 150 may not be uniform. Further, multiple quality WWAN regions 150 may overlap and combine to create collectively larger continuous regions of WWAN communication connectivity.

A drone might travel along any of a large number of routes between a starting location 105 and a destination 195. A shortest route 110 is illustrated as a straight-line route between the starting location 105 and the destination 195. The shortest route 110 illustrated in FIG. 1 is also convenient because there are no obstacles along the way. However, in the example illustrated in FIG. 1, the shortest route 110 largely lays outside of quality WWAN regions 150.

In accordance with various embodiments, a quality communications route 120 may be determined for a drone that provides sufficient wireless communications connectivity by passing through a series of quality WWAN regions 150 as illustrated by the solid line. The quality communications route 120 is less direct and thus a longer route than the shortest route 110. However, the quality communications route 120 provides network connectivity through most, if not all, of the journey between the starting location 105 and the destination 195.

A processor, in the drone or a remote computer in communication with the drone, may obtain radio link quality data corresponding to a 3-D region in which wide area network (WWAN) communications are available. The 3-D region may encompass the entire environment 100, a subset thereof, or a broader area. Also, the 3-D region may include a plurality of smaller regions including or near the starting location 105, the destination 195, the surrounding regions, or regions in between. The radio link quality data may be available in a database (e.g., a database hosted on a server accessible through the Internet). Such a database may be populated by wireless network providers, via link quality reports provide by drones and assembled over time, by formal surveys, or other methods. A portion of a radio link quality database may be uploaded to memory of a drone, such as at the start of a mission, to enable a drone processor to access the data from local memory.

The processor may obtain and use the radio link quality data to determine a set route for reaching the destination 195 as part of autonomous route planning. Also, the processor may identify the quality communications route 120 as a best route (i.e., optimize for WWAN communications) through the 3-D region based on the obtained radio link quality data as well as other criteria. By using the quality communications route 120, rather than a shortest route 110, the drone may experience improved communications while enroute to the destination 195.

Rather than being an exact or precise line of flight, the quality communications route 120, or other set routes, may include boundaries or constraints within which the drone may stay in order to provide sufficient or minimum acceptable availability of WWAN communications. The size of the boundaries or constraints may depend upon the availability of quality WWAN communications and or physical boundaries constraining a region (e.g., no-fly zones, mountains, moving obstructions, hazards, etc.). Also, the quality communications route 120 may not guarantee WWAN communications throughout. For example, the quality communications route 120 may increase a likelihood that the WWAN communications can be established, provide communication opportunities periodically, and/or provide communication opportunities at specific times or waypoints enroute to the destination 195.

In addition to or in conjunction with considering radio link quality data, the quality communications route 120 may be determined based on traditional navigational planning considerations. For example, determining the quality communications route 120 may include minimizing fuel consumption, increasing or ensuring safety of the drone or a payload thereof, avoiding flying over populated areas, and other route planning criteria.

Figure 2:
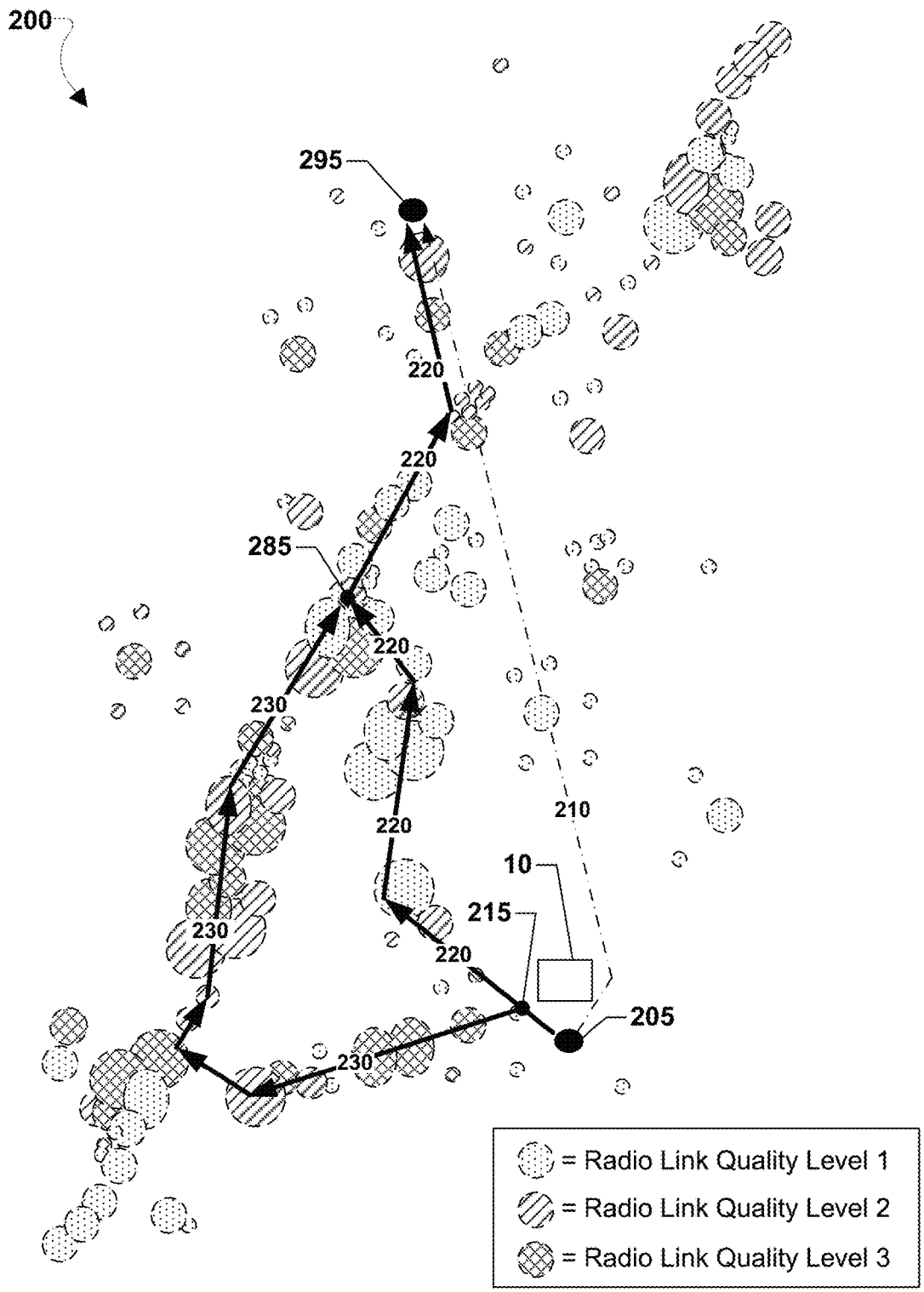
FIG. 2 is a plan view of an environment including different levels and sizes of quality WWAN regions for use in various embodiments.

FIG. 2 illustrates a plan view of an environment 200 including different levels and sizes of quality WWAN regions in accordance with various embodiments. With reference to FIGS. 1-2, the environment 200 includes a region surrounding and including a starting location 205 and a destination 295. Various quality WWAN regions are denoted by circles or ovals. The size of each circle or oval corresponds to the area covered by the individual quality WWAN regions.

The various quality WWAN regions may be characterized by a level of the radio link quality within the region. The level of the radio link quality may be measured by various attributes (e.g., a probability number for maintaining and/or establishing a radio link). In FIG. 2, the quality WWAN regions with the lowest level are denoted with a dotted fill (i.e., Radio Link Quality Level 1); the quality WWAN regions with an intermediate level are denoted with a diagonal line fill (i.e., Radio Link Quality Level 2); and the quality WWAN regions with the highest level are denoted with crosshatched fill (i.e., Radio Link Quality Level 3).

In the environment 200, a shortest route 210 is denoted with phantom lines and includes a turn around a large tall structure 10. However, the shortest route 210 does not pass through many quality WWAN regions and at the beginning only passes through one with Radio Link Quality Level 1.

A processor performing navigational planning optimization may want to consider radio link quality data in order to ensure at least a minimum level of WWAN communications enroute to the destination 295. Thus, in determining a set route that includes at least a minimum level of WWAN communications a processor may determine a first quality communications route 220, which is longer and less direct than the shortest route 210, but frequently provides at least some (including lowest level) connectivity (i.e., Radio Link Quality Levels 1 and 2) during the first half thereof.

Alternatively, the processor performing navigational planning optimization may maximize the availability of the WWAN communications by determining a set route with the highest probability of maintaining the radio link. A second quality communications route 230 is illustrated that starts off in the same direction as the first quality communications route 220, but turns laterally at a first intermediate location 215. The second quality communications route 230 then meets backup with the first quality communications route 220 at a second intermediate location 285, after which the first and second quality communications routes 220, 230 are coincident with one another. The second quality communications route 230 is even longer than the first quality communications route 220, but passes through several quality WWAN regions exhibiting the highest levels of connectivity (i.e., Radio Link Quality Levels 1-3), and travels through quality WWAN regions over a higher percentage of the route to the destination 295. Thus, a processor determining a set route for reaching a destination that maximizes the availability of WWAN communications may determine a set route like the second quality communications route 230, particularly for missions requiring frequent if not constant communications and/or high bandwidth wireless communications.

Figure 3:
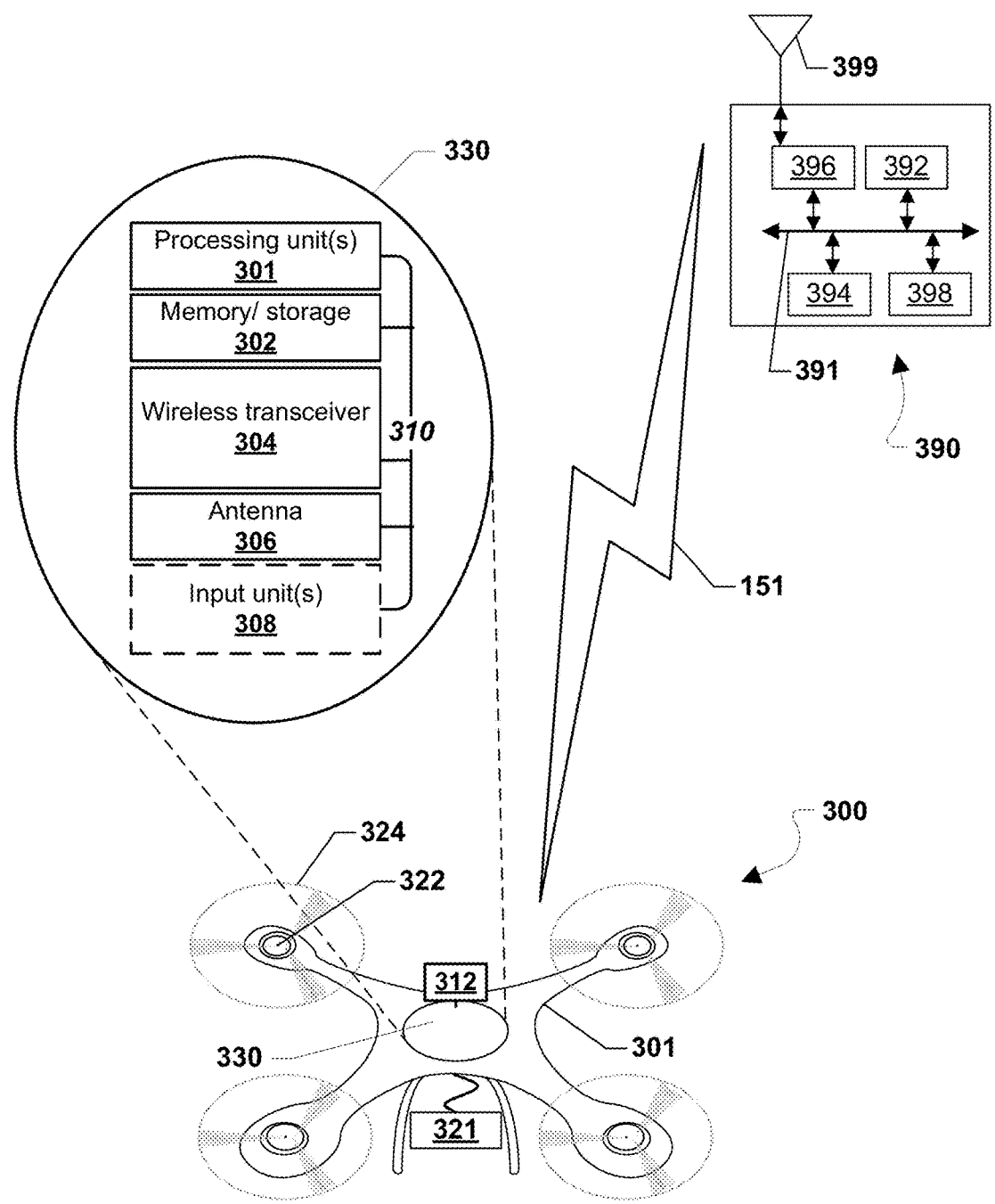
FIG. 3 is a block diagram illustrating components of a typical drone and a ground station suitable for use in various embodiments.

Various embodiments may be implemented within a variety of drones, an example of which in the form of a four-rotor drone is illustrated in FIG. 3 that is suitable for use with various embodiments. With reference to FIGS. 1-3, the drone 300 may include a body 301 (i.e., fuselage, frame, etc.) that may be made out of any combination of plastic, metal, or other materials suitable for flight. The body 301 may include a processor 330 that is configured to monitor and control the various functionalities, subsystems, and/or other components of the drone 300. For example, the processor 330 may be configured to monitor and control various functionalities of the drone 300, such as any combination of modules, software, instructions, circuitry, hardware, etc. related to propulsion, navigation, power management, sensor management, and/or stability management.

The processor 330 may include one or more processing unit(s) 301, such as one or more processors configured to execute processor-executable instructions (e.g., applications, routines, scripts, instruction sets, etc.) to control navigation, operation, and other operations of the drone 300, including operations of various embodiments. In some embodiments, the processor 330 may be coupled to a memory unit 302 configured to store data (e.g., navigational/route plans, obtained sensor data, received messages, applications, etc.).

In various embodiments the processor 330 may be coupled to communication resources, including a wireless transceiver 304 and antenna 306 for transmitting and receiving wireless signals (e.g., a Wi-Fi® radio and antenna, Bluetooth®, RF, etc.). Because drones often fly at low altitudes (e.g., below 400 feet), the drone 300 may scan for WWAN communication signals (e.g., Wi-Fi signals, Bluetooth signals, cellular signals, etc.) associated with transmitters (e.g., beacons, Wi-Fi access points, Bluetooth beacons, small cells (picocells, femtocells, etc.), etc.) such as beacons or other signal sources within restricted or unrestricted areas near or on a set route to a destination. The communication resources may receive data from radio nodes, such as navigation beacons (e.g., very high frequency (VHF) omnidirectional range (VOR) beacons), Wi-Fi access points, cellular network base stations, radio stations, etc.

Drones may navigate using navigation systems such as Global Navigation Satellite System (GNSS), Global Positioning System (GPS), onboard sensors, etc. In some embodiments, the drone 300 may use an alternate source of positioning signals (i.e., other than GNSS, GPS, etc.). The drone 300 may use location information associated with the source of the alternate signals together with additional information (e.g., dead reckoning in combination with last trusted GNSS/GPS location, dead reckoning in combination with a position of the drone takeoff zone, etc.) for positioning and navigation in some applications. Thus, the drone 300 may navigate using a combination of navigation techniques, including dead-reckoning, camera-based recognition of the land features below and around the drone 300 (e.g., recognizing a road, landmarks, highway signage, etc.), etc. that may be used instead of or in combination with GNSS/GPS location determination and triangulation or trilateration based on known locations of detected wireless access points.

In some embodiments, the processor 330 of the drone 300 may further include various input units 308 for receiving ground control instructions (e.g., navigational commands, regional survey information, route updates/options, or a search maneuver for use in response to significant degradation or loss of radio link quality), data from human operators, and/or for collecting data indicating various conditions relevant to the drone 300. For example, the input units 308 may include camera(s), microphone(s), sensor(s), location information functionalities (e.g., a global positioning system (GPS) receiver for receiving GPS coordinates), navigational instruments (e.g., attitude indicator(s), gyroscope(s), accelerometer(s), altimeter(s), compass(es), etc.), keypad(s), etc. The various components of the processor 330 may be connected via a bus 310 or other similar circuitry.

The body 301 may include landing gear of various designs and purposes, such as legs, skis, wheels, pontoons, etc. The body 301 may also include a payload mechanism 321 configured to hold, hook, grasp, envelope, and otherwise carry various payloads, such as boxes. In some embodiments, the payload mechanism 321 may include and/or be coupled to actuators, tracks, rails, ballasts, motors, and other components for adjusting the position and/or orientation of the payloads being carried by the drone 300. For example, the payload mechanism 321 may include a box moveably attached to a rail such that payloads within the box may be moved back and forth along the rail. The payload mechanism 321 may be coupled to the processor 330 and thus may be configured to receive configuration or adjustment instructions. For example, the payload mechanism 321 may be configured to engage a motor to re-position a payload based on instructions received from the processor 330.

Drones may be winged, rotorcraft varieties, or have other mechanisms for causing movement from one location to another. The example drone 300 illustrated in FIG. 3 is a rotorcraft variety that uses one or more rotors 324 driven by corresponding motors 322 to provide lift-off (or take-off) as well as other aerial movements (e.g., forward progression, ascension, descending, lateral movements, tilting, rotating, etc.). The drone 300 may utilize various motors 322 and corresponding rotors 324 for lifting off and providing aerial propulsion. For example, the drone 300 may be a "quadcopter" that is equipped with four motors 322 and corresponding rotors 324. The motors 322 may be coupled to the processor 330 and thus may be configured to receive operating instructions or signals from the processor 330. For example, the motors 322 may be configured to increase rotation speed of their corresponding rotors 324, etc. based on instructions received from the processor 330. In some embodiments, the motors 322 may be independently controlled by the processor 330 such that some rotors 324 may be engaged at different speeds, using different amounts of power, and/or providing different levels of output for moving the drone 300. For example, motors 322 on one side of the body 301 may be configured to cause their corresponding rotors 324 to spin at a higher rotations per minute (RPM) than rotors 324 on the opposite side of the body 301 in order to balance the drone 300 burdened with an off-centered payload. The drone 300 is illustrated as an example of a drone that may utilize various embodiments, but is not intended to imply or require that various embodiments are limited to rotorcraft drones. Instead, various embodiments may be use with winged drones as well. Further, various embodiments may equally be used with land-based autonomous vehicles, water-borne autonomous vehicles, and space-based autonomous vehicles.

The body 301 may include a power source 312 that may be coupled to and configured to power the various other components of the drone 300. For example, the power source 312 may be a rechargeable battery for providing power to operate the motors 322, the payload mechanism 321, and/or the units of the processor 330.

While the various components of the drone 300 are illustrated in FIG. 3 as separate components, some or all of the components (e.g., the body 301, the processor 330, the motors 322, and other elements) may be integrated together in a single device or unit, such as a system-on-chip. The drone 300 and elements thereof may also include other components not illustrated in FIG. 3.

The processor 330 may be configured to communicate with a ground station 390 through a wireless connection 151 (e.g., accessed in quality WWAN regions) via the communication resources to receive and transmit information with the ground station 390. The wireless connection 151 may be a bi-directional wireless link established between the antenna 306 of the drone 300 and one or more antennas 399 of the ground station 390.

The ground station 390 may be a mobile telephony network base station (e.g., an eNodeB), a drone controller, a server, or another electronic system that may provide navigation assistance and other information to one or more drones (e.g., the drone 300). Examples of mobile telephony networks include Third Generation (3G), Fourth Generation (4G), Long Term Evolution (LTE), Time Division Multiple Access (TDMA), Code Division Multiple Access (CDMA), CDMA 2000, Wideband CDMA (WCDMA), Global System for Mobile Communications (GSM), Single-Carrier Radio Transmission Technology (1×RTT), and Universal Mobile Telecommunications Systems (UMTS). The ground station 390 may be configured to establish network interface connections with other networks, such other broadcast system computers and servers, the Internet, the public switched telephone network, and/or a cellular data network.

The ground station 390 may include a processor 392 for executing software instructions. The ground station 390 may include a memory for storing code and data. For example, the memory 394 may store navigation data and other information that may be transmitted to a drone. In some embodiments, the ground station 390 may communicate with a drone controller that provides the navigation information to the drone. The memory 394 may include one or more of random access memory (RAM), dynamic RAM (DRAM), static RAM (SRAM), read only memory (ROM), electrically erasable programmable ROM (EEPROM), or other types of non-transitory computer-readable storage media.

The ground station 390 may include at least one network interface 396. The network interface 396 may be used to communicate with drones and other devices or vehicles over a communications network, such as a wireless wide area network (WWAN) (e.g., a mobile telephony network) or a local area network (e.g., Wi-Fi). The network interface 396 may be connected to one or more antennas 399 to transmit and receive communication beams with the drones. The processor 392, in conjunction with the network interface 396, may form radio frequency (RF) communication beams using the antennas 399. The ground station 390 may also include a power interface 398 for providing power to the ground station 390. The ground station 390 may include a bus 391 that connects the various components of the ground station 390 together.

The ground station 390 may also include various other components not illustrated in FIG. 3. For example, the ground station 390 may include a number of processing components such as modems, transceivers, subscriber identification module (SIM) cards, additional processors, additional hard drives, universal serial bus (USB) ports, Ethernet ports, and/or other types of wired or wireless input/output ports, keyboard, mouse, speaker, microphone, display screen, touchscreen, and many other components known in the art.

Figure 4:
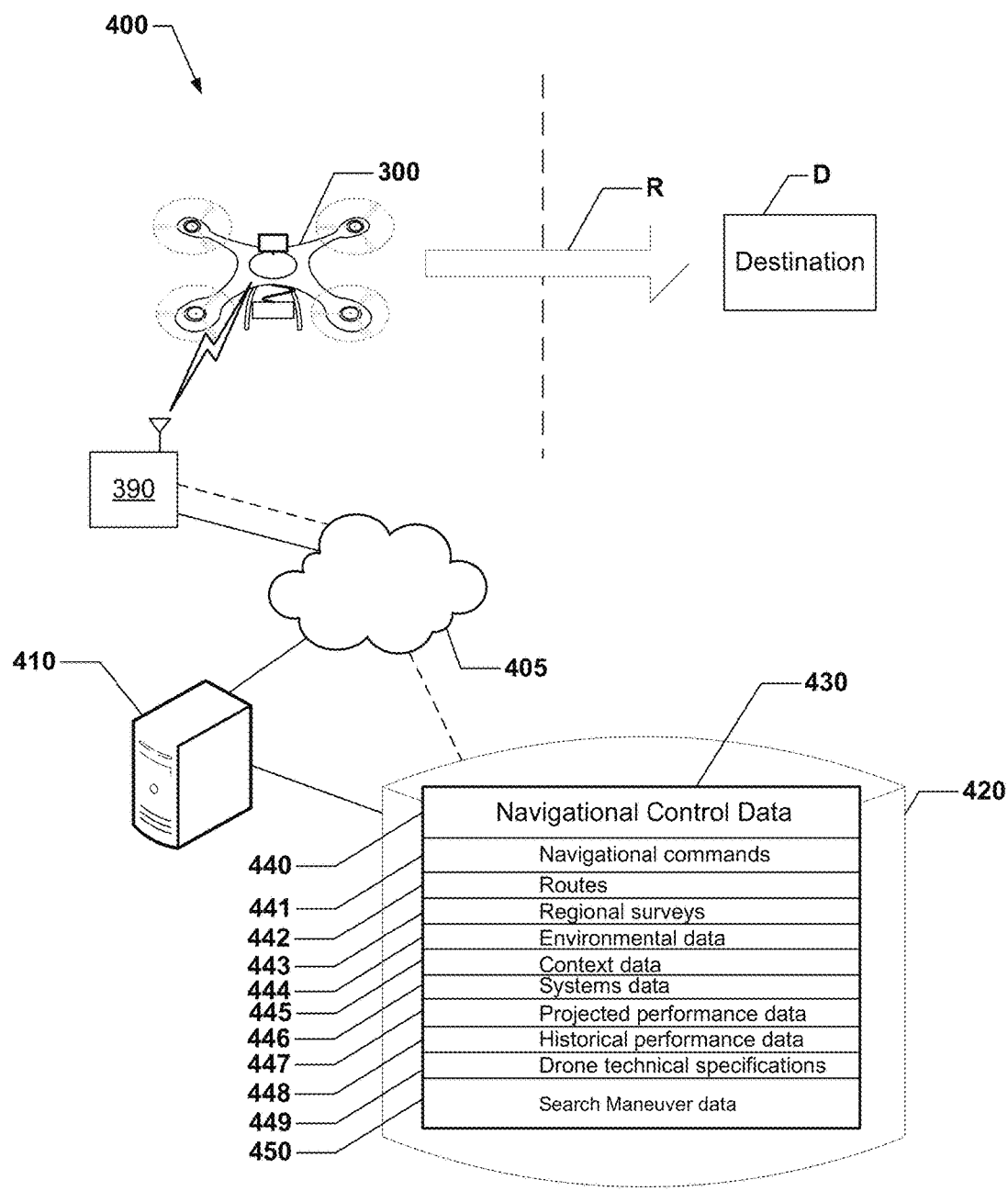
FIG. 4 is a schematic diagram illustrating a drone in communication with a server using a ground station according to various embodiments.

In various embodiments, a drone (e.g., drone 300 in FIG. 3) may access information, such as navigational control data from onboard components, such as memory (e.g., 302) or sensors (e.g., input units 308) and/or a remote computing device via communication resources (e.g., wireless transceiver 304 and antenna 306) as illustrated in FIG. 4. With reference to FIGS. 1-4, the drone 300 in an environment 400 may communicate with a server 410 (i.e., a remote computing device) regarding navigational control data maintained in a database 430 of a data storage device 420. The drone 300 may exchange communications with the server 410, for example via the ground station 390 and the telecommunication network 405, while moving or stationary. Via such communications, the drone 300 may receive navigational control data or an update to navigational control data (e.g., route changes, control commands, radio link quality updates, and/or search maneuvers for radio link quality trigger events) from a server compiling and/or maintaining a database of such data. The drone processor (e.g., 330) may store the received navigational control y data in memory (e.g., 302) and use the data when determining a set route R for reaching a destination D or a search maneuver in response to a radio link quality trigger event according to various embodiments. The drone 300 may assess the suitability of a particular quality WWAN region, including the course to get there and the set route R to a destination D, or the suitability of a particular search maneuver based on the navigational control data in conjunction with mission parameters.

In the environment 400, the database 430 is described herein in further detail with regard to navigational control data 440 stored in the data storage device 420; however, the same or similar information may be compiled and/or stored in the onboard memory (e.g., memory unit 302) of the drone 300. Navigational control data 440 may be determined and/or compiled by at least one of the server 410, the ground station 390, the drone 300, other drones, other source(s) and/or a combination thereof, and shared through the telecommunication network 405. The navigational control data 440 in the database 430 may include various types of information regarding navigational commands 441, routes 442, regional surveys 443, environmental data 444, context data 445, system data 446, projected performance data 447, historical performance data 448, drone technical specifications 449, search maneuvers data 450, and other data related to navigational controls.

The navigational commands 441 may include inputs used by a drone's navigation system for autonomous or semi-autonomous navigation. The navigational commands may allow the drone to navigate autonomously with or without relying on a GPS signal or trained personnel. When not relying on GPS, the drone's processor may use onboard sensors (e.g., accelerometers, gyroscopes, magnetometers, and cameras) in combination with learning systems to estimate its own position/location and orientation, and recognize its environment. In addition, the drone's processor may correlate the position/location, orientation, and environmental data to a current route or a search maneuver in order to stay on course or successfully attempt to improve a radio link. Thus, the processor executing a control algorithm using navigational commands may move the drone efficiently and effectively. In addition, navigational commands 441 may be provided from a drone operator and/or manager, which may override other data. For example, navigational commands 441 from a drone operator may indicate an otherwise open and clear parcel of land is off-limits for travel. Navigational commands 441 may be real-time data, non-real time data, and/or a combination thereof.

The route data 442 for reaching a destination or quality WWAN region may provide coordinates and navigational directions to a destination and/or one or more quality WWAN regions. The route data 442 may also include more than one course (i.e., alt. routes) that could be used to reach particular region(s) or a destination. In addition, the route data 442 may include power expense estimates/requirements (i.e., power expenditures) for reaching and/or using the quality WWAN region. An energy expenditure associated with completing a course to a quality WWAN region may offset the ability to meet regulatory requirements and maintain WWAN communications.

The regional surveys 443 may reflect available information about an area in which the drone is located or a potential region for WWAN communications. For example, regional surveys 443 may include probability numbers for maintaining and/or establishing a radio link (i.e., radio link quality information), including estimates of how strong communication signals will be, signal strength levels (i.e., actual measurements), the stability or reliability of the signal quality, a mapping of signal quality or strength within the region, or the availability, restrictions and/or risks associated with the region. Quality WWAN regions, particularly in urban areas or at popular regions, may become crowded with several drones or other obstructions. To address this potential, regional survey information may reflect the number of drones or other moving and/or stationary objects that are currently in the region and whether a particular region is too crowded or hazardous to enter.

Some quality WWAN regions may have time-of-day restrictions, require certain authorizations, or have other access limitations. Risks in a particular region may reflect a likelihood that people or creatures might interfere or tamper with the drone 300. For example, the radio link quality data may reflect a preference for less crowded regions that tend to be safer. Risk assessments may also reflect other dangerous conditions, such as falling debris or other hazards.

In addition, regional surveys 443 may include optimization details regarding a region. For example, the regional surveys 443 may include radio link quality information in one or more areas (e.g., a region or location), such as locations in which WWAN communication signals are present, courses to quality WWAN regions (e.g., 150), a best approach to a region, details regarding obstructions therein, as well as movement requirements within a region (e.g., due to obstructions or wind patterns). Further, regional survey information may include details regarding how many drones a quality WWAN region may accommodate, how many drones are currently occupying a quality WWAN region, or scheduling information reflecting peak traffic times, off-peak traffic times, average usage times, or the like. In this way, the fact that particular quality WWAN region is too crowded with other drones may be reflected in the radio link quality data for use when assessing that quality WWAN region.

Environmental data 444 may include temperature, wind speed, precipitation, and/or humidity, which may influence how a drone operates and thus may be used to generate the search maneuver.

Context data 445 may include the geographical location of the drone (i.e., GPS-based or altimeter), nearby obstacles/structures, a speed of the drone, whether the drone is hovering, rising, or descending, which may be inferred, for example, by sensors included on the drone.

Systems data 446 may include information about the drone itself or the drone's payload, obtained from on-board sensors/indicators (e.g., battery power levels, component impairment/failure, etc.) or one or more remote sensors communicating with the drone through a short-range connection, such as Bluetooth® or Wi-Fi, or through a long-range WWAN connection.

Projected performance data 447 may include estimates for drone performance, such as range, maximum speed, energy cell capacity, or other performance estimates for onboard components.

Historical performance data 448 may be similar to projected performance data 447, but based on actual performance of the drone or components therein. For example, historical performance data 448 may include distances traveled correlated to energy cell levels, recorded reduced ranges based on measured head winds, or success rates for particular search maneuvers or elements thereof.

Drone technical specifications 449 may include dimensions, weights, configuration data (e.g., fixed-wing versus multi-rotor), or other details about the drone.

The database 430 may also include search maneuvers data 450, which may include an assigned search maneuver for use by the drone 300 in response to a radio link quality trigger event. In various embodiments, the search maneuvers data 450 may be determined by the processor (e.g., 330) of the drone, a ground station (e.g., 390), another drone, or a combination thereof. The drone may receive search maneuvers data 450 generated or transmitted from a remote computing device as an input from an onboard interface (e.g., 308) or through a wireless connection (e.g., 151). The search maneuvers data 450 may be determined at various times. For example, one or more search maneuvers may be determined when needed (e.g., while the drone is in motion and in response to a radio link quality trigger event) or may be previously determined.

The search maneuvers data 450 may include particular information about individual search maneuvers and components thereof. For example, each search maneuver includes a set of movements that follow at least one preconfigured deviation pattern. The search maneuvers data 450 may separately include details regarding different preconfigured deviation patterns. The preconfigured deviation patterns may be configured well in advance of radio link quality trigger events and may be independent of any radio link quality information. The preconfigured deviation patterns may be used to generate one or more new search maneuvers when needed (i.e., not in advance). Since individual search maneuvers may include at least one preconfigured deviation pattern, the search maneuvers may also be determined independent of any radio link quality information. In addition, since the search maneuvers follow at least one preconfigured deviation pattern, the search maneuvers are not configured to direct the drone to a known location, like a previous location with good radio link quality or return to a home base.

The preconfigured deviation pattern may include at least one movement characteristic selected from patterns that include at least one of a spiral, a geometric shape, a change in elevation (i.e., increase or decrease), maintaining a fixed elevation, movement at least partially in a direction of the set route, and a combination thereof. Also, the form of the spiral or geometric shape may change during the search maneuver. For example, the preconfigured deviation pattern may include a spiral with a gradually increasing radius. In addition, the search maneuver may include a modified version of a select preconfigured deviation pattern that takes into account at least one of a size of an initial cycle of the preconfigured deviation pattern, a change in the size of the initial cycle for one or more subsequent cycles of the preconfigured deviation pattern, a change in a movement characteristic of the preconfigured deviation pattern, avoidance of an object or obstacle, navigational restrictions, and/or an available power level of the drone. Further, the search maneuver may include a modified version of the preconfigured deviation pattern that takes into account a detected radio link obstruction interfering with a radio link quality of communications with the drone. For example, the modified version of the preconfigured deviation pattern may be directed away from the detected radio link obstruction. As a further alternative, the processor may initiate a semi-random movement pattern to search for connectivity.

In some embodiments, the navigational control data 440 may include details regarding a source or sources of information from which the navigational control data may be obtained. Such information regarding navigational controls may include or be based on historical and/or current data that has been observed and/or compiled by other drones, regional sensors, and other data collection sources. In addition, the navigational control data may include ratings or rankings for information or sources of information from which navigational control data has previously been obtained. The ratings or ranking may be used to indicate the trustworthiness or reliability of information or its source.

In addition to information from remote sources (e.g., the ground station 390 or the server 410), the drone 300 may use onboard and/or deployable sensors to find and evaluate a region. For example, an onboard camera, anemometer, humidity (i.e., rain) gauge, and/or other sensor(s) may help find or identify quality WWAN regions, assess conditions once within that region, and/or determine a search maneuver to use. A deployable sensor may be dropped or ejected from the drone 300. Alternatively, the deployable sensor may itself be a drone-type component configured to autonomously move away from (and optionally return to) the drone 300. The drone 300 may store data from onboard sensors in the onboard memory (e.g., memory unit 302) and share the data with the server (e.g., 410), which in-turn may further share the data with other drones. In addition, while in a particular region, the drone 300 may be configured to analyze real-time data obtained by an onboard or remote sensor for assessing the suitability of the quality WWAN region for WWAN communications or a search maneuver to improve radio link quality. For example, the processor may monitor and record various wireless link measurements (e.g., received power level, signal-to-noise ratio, packet error rate, etc.) made by RF resources.

In some embodiments, the database 430 or a portion of the database may be stored in memory (e.g., memory unit 302) of the drone 300. The drone 300 may receive updated database information from a server (e.g., 410) at regular intervals (e.g., hourly, daily, etc.), and use such information to update the database 430 stored in onboard memory.

By maintaining a local version of the database in the memory (e.g., 302) of the drone, the frequency of communications between the drone 300 and the server 410 may be reduced, which may reduce overhead, traffic load, etc. Reducing the need to communicate with the server 410 may be advantageous in circumstances in which wireless wide area network (WWAN) connectivity or connectivity with other networks is unavailable or unreliable.

In some embodiments, the information (e.g., navigational control data 440) stored in the memory of the drone 300 may have a limited useful life, which may be indicated when the information is obtained (e.g., by an expiration time). The drone 300 may track the expiration of the information stored in the memory using a timer or the like. For example, if the database information has expired or is otherwise beyond the indicated useful life, the drone processor may contact the server 410 to reload the latest database information. In some embodiments, a drone storing expired database information may not be allowed to deviate from a current course, except in an emergency.

In various embodiments, the drone 300 may communicate with the server 410 before the drone 300 starts moving, as the drone 300 starts moving, or at other designated times in order to confirm that the latest information update from the database 430 has been loaded. Once the information is confirmed as current or updated, the drone 300 may proceed without communications with the server 410 until the expiration of the timer or upon occurrence of some other predetermined event (e.g., query by a third party).

Although only a single one of the server 410 is shown in the operating environment 400, the database 430 or the information in the databases 430, may be distributed among many servers. Alternatively or additionally, the servers may be redundant, so that the drone 300 may be configured to communicate with a selected one of the servers. The selection of a server with which to communicate may be based on a criteria or condition, such as the proximity of the server to the drone 300, the wireless link quality between the server and the drone 300, an affiliation or classification of the server (e.g., military, government, commercial, private, etc.), a reputation of the server, an operator of the server, and so on.

In some embodiments, the database information stored and/or maintained on a given server (e.g., 410) may be populated by other servers (or entities) or by access to other servers (or entities). For instance, a server may be configured to query or otherwise obtain event information from an entity/server associated with a restricted area in which an event may be taking place or may be scheduled to take place in the restricted area.

The drone (e.g., 300) may detect a degradation of radio link quality or a complete loss of a radio link. Thus, in accordance with various embodiments, a processor of the drone may monitor and measure radio link quality in order to detect radio link quality trigger events. In response to determining that a radio link quality trigger event has occurred, the drone may initiate a search maneuver for improving radio link quality.

Figure 5:
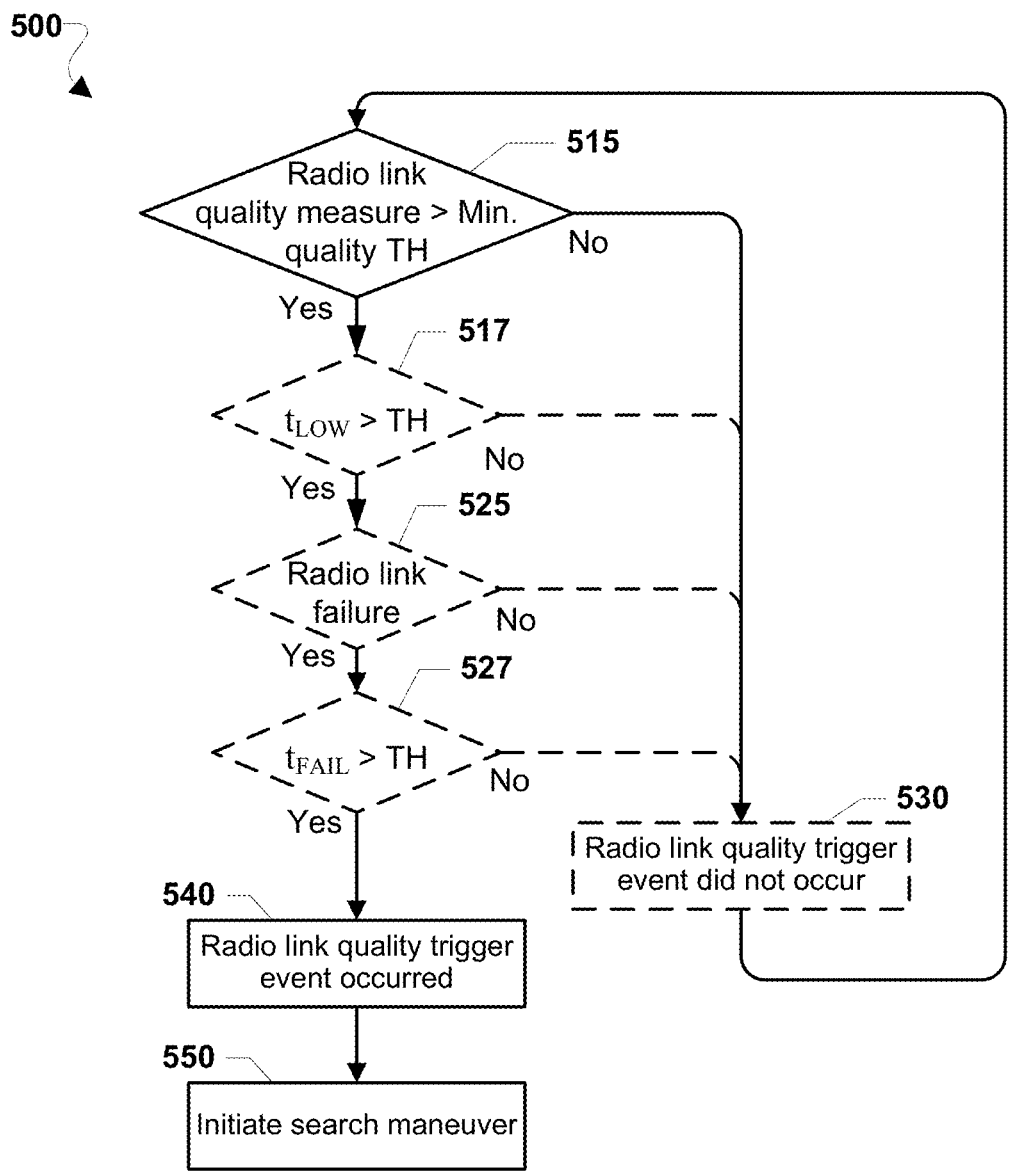
FIG. 5 is a process flow diagram illustrating a method for navigating a drone, including determining whether a radio link quality trigger event occurred, according to various embodiments.

FIG. 5 illustrates a method 500 of navigating a drone according to various embodiments. With reference to FIGS. 1-5, the operations of the method 500 may be performed by a processor (e.g., the processor 330 of the drone 300, the processor 392 of the ground station 390, or other remote computing device).

In determination block 515, the processor may determine whether the measure of radio link quality exceeds a minimum radio link quality threshold value (i.e., Min. quality TH). The minimum radio link quality threshold value may be a minimum value needed to establish and maintain a radio link in a WWAN communication network. Alternatively, the minimum radio link quality threshold value may be set higher than the minimum radio link quality level needed, which may ensure a more reliable and steady communication link.

In response to determining that the measure of radio link quality is less than or equal to (i.e., does not exceed) the minimum radio link quality threshold value (i.e., determination block 515="No"), the processor may continue monitoring and measuring radio link quality and repeat determination block 515. Optionally, in response to determining that the measure of radio link quality does not exceed the minimum radio link quality threshold value (i.e., determination block 515="No"), the processor may register that a radio link quality trigger event did not occur in optional block 530.

The radio link quality signal(s) transmitted to and received by the remote computing device may be used to maintain or update a radio link quality database (e.g., database 430) with updated and realistic measures of the radio link quality in various locations. The radio link quality data maintained in the database may be compiled from various devices, including drones (e.g., crowd sourcing) or other devices with a sensor or other instrument for measuring radio link quality.

A collection of radio link quality measurements by drones, such as in a database, may increase the overall reliability of a communication network by constraining a set route to something less than all available regions. Drones may crowd-source network quality information enroute to a destination and report back to a centralized database that may compile an overall map of network quality measurements.

In response to determining that the received measure of radio link quality exceeds the minimum quality threshold value (i.e., determination block 515="Yes"), the processor may optionally determine whether a low quality period ($t_{LOW}$) exceeds a low quality timeout threshold in optional determination block 517. The low quality period ($t_{LOW}$) may reflect how long the measure of radio link quality has continuously and/or consistently not exceeded the minimum quality threshold value at the time the determination in optional determination block 517 is made. For example, the low quality period $t_{LOW}$ may be between one-half second and five seconds. In various embodiments, the low quality period $t_{LOW}$ may be one second.

In response to determining that the low quality period ($t_{LOW}$) does not exceed the low quality timeout threshold (i.e., optional determination block 517="No"), the processor may continue monitoring and measuring radio link quality and repeat determination block 515. Optionally, in response to determining that the low quality period $t_{LOW}$ does not exceed the low quality timeout threshold (i.e., optional determination block 517="No"), the processor may register that a radio link quality trigger event did not occur in optional block 530.

In response to determining that the low quality period ($t_{LOW}$) exceeds the low quality timeout threshold (i.e., optional determination block 517="Yes"), the processor may optionally determine whether a radio link failure has occurred in optional determination block 525.

A radio link failure may represent either a very low-quality or unreliable connection or no connection at all. Another common radio link failure occurs when a handover is attempted but fails to complete, resulting in the unreliable connection.

In response to determining that a radio link failure has not occurred (i.e., optional determination block 525="No"), the processor may continue monitoring and measuring radio link quality and repeat determination block 515. Optionally, in response to determining that the radio link failure has not occurred (i.e., optional determination block 525="No"), the processor may register that a radio link quality trigger event did not occur in optional block 530.

In response to determining that a radio link failure has occurred (i.e., optional determination block 525="Yes"), the processor may optionally determine whether a radio link failure period ($t_{FAIL}$) exceeds a radio link failure timeout threshold in optional determination block 527. The radio link failure period $t_{FAIL}$ may reflect how long the measure of radio link quality has continuously and/or consistently registered as a radio link failure at the time the determination in optional determination block 527 is made. For example, the radio link failure period $t_{FAIL}$ may be between half a second and five seconds. In various embodiments, the radio link failure period $t_{FAIL}$ may be 1 second.

In response to determining that the radio link failure period ($t_{FAIL}$) does not exceed the radio link failure timeout threshold (i.e., optional determination block 527="No"), the processor may continue monitoring and measuring radio link quality and repeat determination block 515. Optionally, in response to determining that the radio link failure period $t_{FAIL}$ does not exceed the radio link failure timeout threshold (i.e., optional determination block 527="No"), the processor may register that a radio link quality trigger event did not occur in optional block 530.

In response to determining that the radio link failure period $t_{FAIL}$ exceeds the radio link failure timeout threshold (i.e., optional determination block 527="Yes"), the processor may register that a radio link quality trigger event occurred in block 540. Optionally, in response to determining that any one of a) the received measure of radio link quality exceeds the minimum quality threshold value (i.e., determination block 515="Yes"), b) the low quality period $t_{LOW}$ exceeds the low quality timeout threshold (i.e., optional determination block 517="Yes"), or c) a radio link failure has occurred (i.e., optional determination block 525="Yes"), the processor may register that a radio link quality trigger event occurred in block 540.

In block 550, the processor may initiate a search maneuver for improving the radio link quality. In accordance with the method 500, a search maneuver may be initiated in response to one or more metrics dropping below respective thresholds (e.g., Min. quality TH, low quality period $t_{LOW}$, or radio link failure period $t_{FAIL}$). These thresholds may be set to optimize both the mobility performance as well as the amount of computation, power consumption, and signaling overhead incurred by the drone.

The processor may periodically perform and/or repeat the operations in determination blocks 515-550 to assess a radio link quality and initiate a search maneuver when the radio link quality is unsatisfactory. Thus, the method 500 provides a way of navigating a drone that improves connectivity of the drone with WWAN networks by considering radio link quality as part of navigational route determinations.

During missions, a drone may need to maintain communications or a certain level of radio link quality. For example, the drone may need to comply with certain regulatory requirements (e.g., minimum communication link quality level or required periods of communication). As another example, a drone processor detecting a fault condition (e.g., a low battery state or other onboard system problem) may need to communicate information regarding the fault to a control center. Thus, when the drone is unable to perform wireless communications with a ground station, the drone may need to search for regions in which wireless communications may be reestablished or in which better radio link quality may be maintained.

Various embodiments include methods for performing autonomous dynamic radio link search maneuvers (also referred to herein as just "search maneuvers") for a drone to overcome the loss or deterioration of a radio link without prior knowledge of radio link quality in the currently occupied or surrounding regions. In particular, a processor of a drone may determine or automatically initiate a search maneuver for improving the radio link quality or regaining the radio link. In contrast to the method 500, which made determinations regarding both a measure of radio link quality (i.e., determination block 515) and radio link failure (i.e., optional determination block 525), a determination and/or initiation of a search maneuver may result directly from either one of those determinations or potentially other situations. Thus, when predetermined characteristics of radio link quality occur, such an occurrence may be referred to as "radio link quality trigger events." Thus, in response to a radio link quality trigger event, a drone may initiate a search maneuver. Radio link quality trigger events may include a particular low measure of radio link quality, a high rate of deterioration in radio link quality, a period of reduced or no radio link, other circumstances, and combinations thereto. Such radio link quality trigger events may be considered unacceptable for communications with the drone generally or for a particular type of drone communications.

In various embodiments, the search maneuver used by the processor of the drone to improve the radio link quality or regain the radio link may be a predetermined set of movements assigned to be used in response to a radio link quality trigger event. Alternatively, more than one predetermined search maneuver may be available, in which case the processor may select one search maneuver for use from among the available predetermined search maneuvers. As a further alternative, the processor may generate a new search maneuver.

Figure 6:
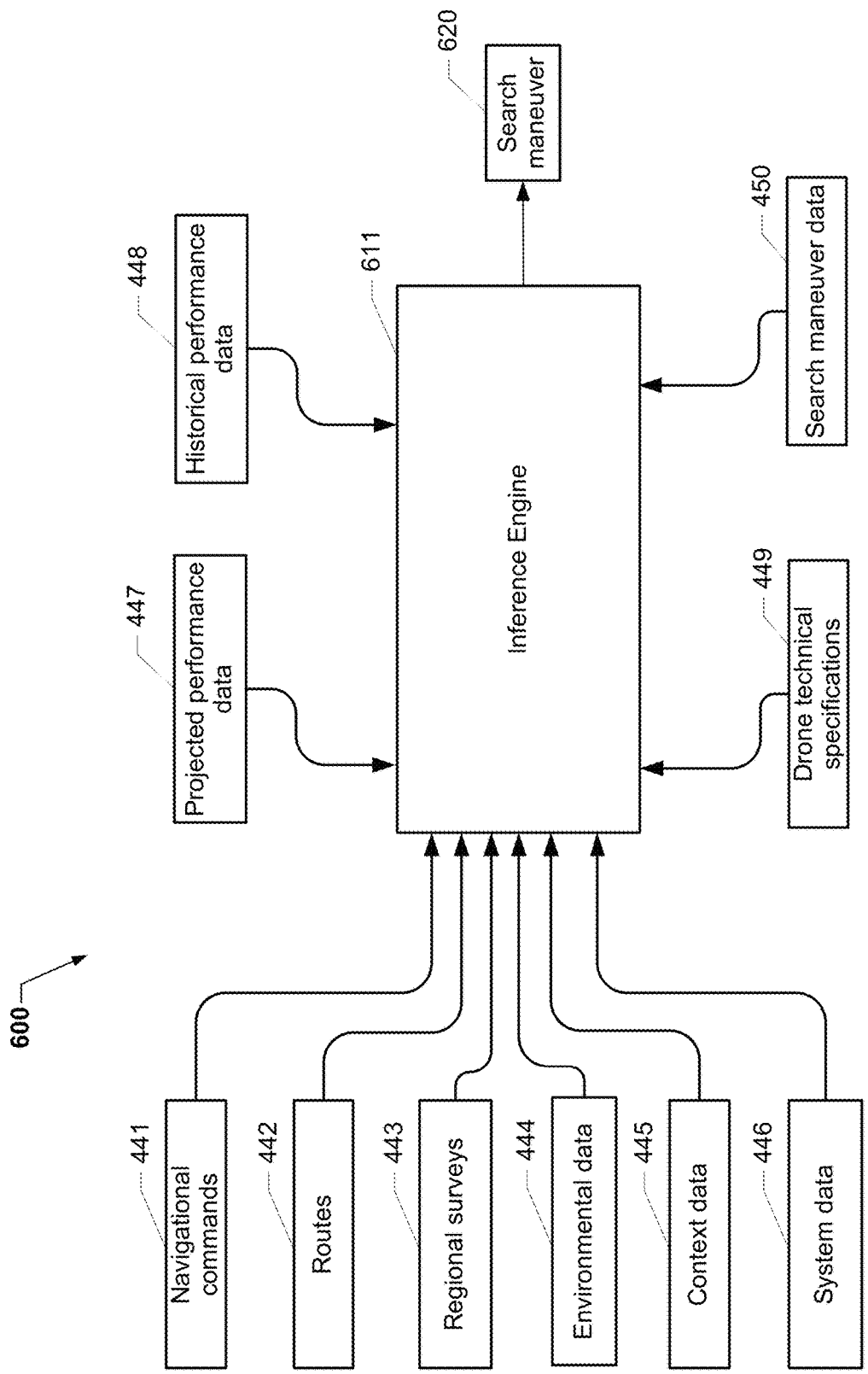
FIG. 6 is a process flow diagram illustrating a method for navigating a drone, including using an inference engine to generate a search maneuver, according to various embodiments.

FIG. 6 illustrates a method 600 of generating a search maneuver 620, which may be used to navigate a drone (e.g., 300) for improving radio link quality, including regaining a radio link. A search maneuver 620 may be generated and immediately used to improve the radio link quality for the drone while navigating enroute to a destination. With reference to FIGS. 1-6, the method 600 may be incorporated into and/or executed by a processor (e.g., the processor 330 of the drone 300, the processor 392 of the ground station 390, or another remote computing device in communication with the drone).

In various embodiments, the processor may determine the search maneuver to use for improving radio link quality by generating the search maneuver 620. The search maneuver 620 may be generated in advance and saved as a predetermined search maneuver or generated in response to determining a radio link quality trigger event has occurred. The processor may use an inference engine 611 to generate the search maneuver 620 by compiling, combining and/or fusing, one or more types of data, including more than one type of navigational control data (e.g., 440), relevant to conditions and/or circumstances that the drone encounters. In some embodiments, the inference engine 611 may combine or fuse both real-time and non-real time input data associated with a drone, such as sensor data and a preconfigured deviation pattern, in order to generate the search maneuver 620 to use.

Real-time input data can include any suitable type of real-time data associated with the drone including navigational control data 440 such as, for instance, environmental data 444, context data 445, drone systems data 446, any other suitable real-time input data, and/or any combination thereof. Non-real time input data may include any suitable type of non-real time data associated with a drone including navigational control data 440 such as, for instance, projected performance data 447, historical performance data 448, drone technical specifications 449, or any other suitable non-real time input data, and/or any combination thereof. For example, both projected performance data 447 and historical performance data 448 may be used in generating the search maneuver 620.

In some embodiments, the inference engine 611 may determine a resource requirement for executing a search maneuver being considered for use. By comparing available resources (e.g., on onboard fuel cell levels) and the resource requirement for executing a considered search maneuver, the inference engine 611 may rule out potential search maneuvers that the drone may not be able to successfully execute.

In some embodiments, the inference engine 611 may use current set route data (i.e., stored navigational instructions directing the drone along the current set route) in determining the search maneuver 620, since before the radio link quality trigger event the current set route was presumably headed toward a destination of the drone. For example, a trajectory vector from the current set route may be a baseline for determining the search maneuver 620 to assign.

Once the search maneuver 620 is generated, the search maneuver 620 may be saved and assigned for later use by the drone as a predetermined search maneuver. In various embodiments, the generated search maneuver 620 may be considered along with other predetermined search maneuvers for selecting the particular search maneuver to use. In various embodiments, the processor may only generate a new search maneuver (e.g., 620) if no predetermined search maneuver is available, assigned to be used, or appropriate for a particular circumstance.

FIGS. 7A-7G illustrate various search maneuvers SM1-SM7 each using different preconfigured deviation patterns P1-P4 that may be followed by a drone in an attempt to reestablish a wireless communication link or to improve radio link quality according to various embodiments. With reference to FIGS. 1-7D the preconfigured deviation patterns P1-P4 are incorporated into search maneuvers SM1-SM7 or portions thereof that may be generated by a processor. Each of the search maneuvers SM1-SM7 is shown starting at a trigger point T along the set route R headed toward a destination. Beyond the trigger point T, a search maneuver vector R' (i.e., an abandoned portion of the set route R) represents a continuation of the set route R that is no longer followed by the drone. Each trigger point T may correspond to the occurrence of a radio link quality trigger event. Search maneuvers, such as the search maneuvers SM1-SM7, may be formed by a combination of the search maneuver vector R', one or more preconfigured deviation patterns P1-P4, and additional navigational control data (e.g., 440).

Figure 7A:
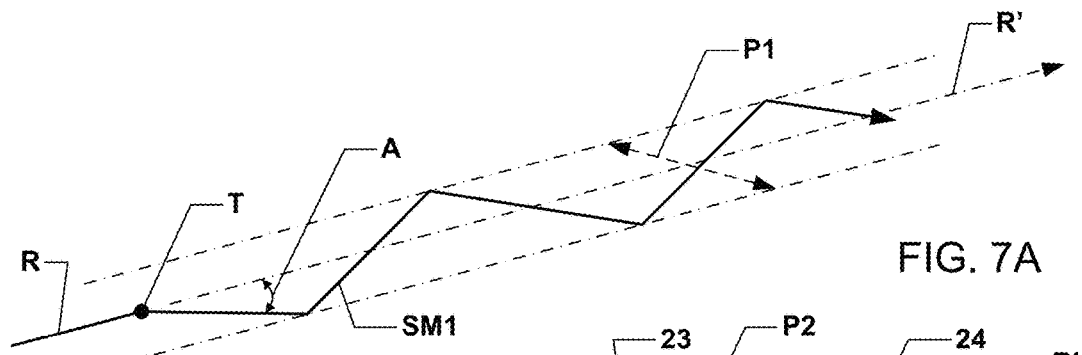
FIGS. 7A-7G are schematic representations of search maneuvers including preconfigured deviation patterns according to various embodiments.

In FIG. 7A, a first preconfigured deviation pattern P1, included in a first search maneuver SM1, is a line perpendicular to the search maneuver vector R', the ends of which are equidistant from the search maneuver vector R'. The first search maneuver SM1 incorporates the first preconfigured deviation pattern P1 by creating a horizontal zigzag route that deviates from the set route R using gradual lateral movements away from the search maneuver vector R'. The first preconfigured deviation pattern P1 is shown having a constant length (i.e., a lateral width) and a constant deviation angle A according to various embodiments. Alternatively, the length and/or the deviation angle A may change over time. As a further alternative, the zigzag route may be vertical (i.e., moving up and down rather than side to side).

Figure 7B:
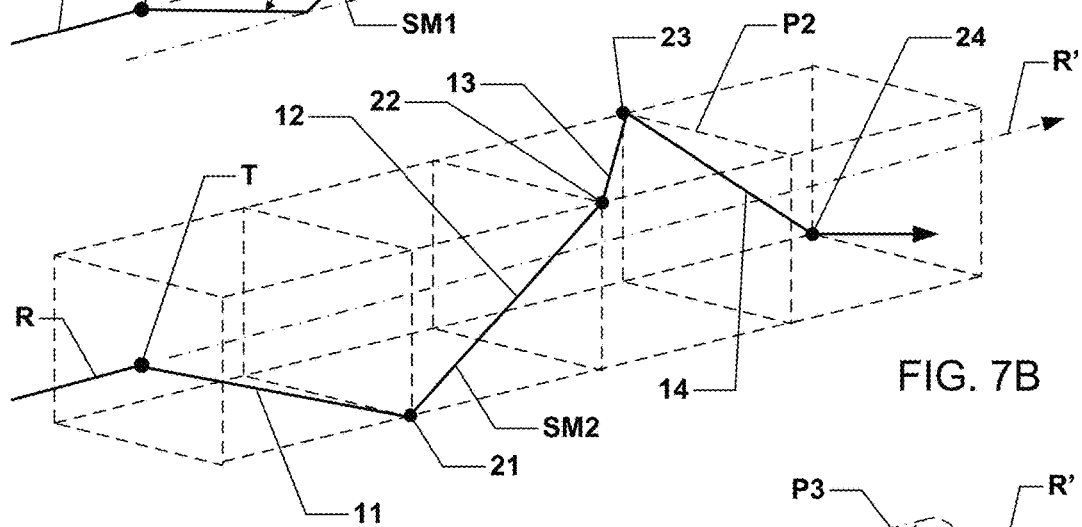

In FIG. 7B, the second preconfigured deviation pattern P2, included in a second search maneuver SM2, is a square or box-like virtual geometric shape, the corners of which are equidistant from the search maneuver vector R'. The second search maneuver SM2 incorporates the second preconfigured deviation pattern P2 by creating a route that combines the search maneuver vector R' with a path that sequentially intersects the corners 21, 22, 23, 24 of the square virtual geometric shape. In this way, a first leg 11 of the second search maneuver SM2 extends from the trigger point T to a first corner 21, a second leg 12 of the second search maneuver SM2 extends from the first corner 21 to a second corner 22, a third leg 13 of the second search maneuver SM2 extends from the second corner 22 to a third corner 23, and a fourth leg 14 of the second search maneuver SM2 extends from the third corner 23 to a fourth corner 24. One cycle of the second search maneuver SM2 intersects all of the corners 21, 22, 23, 24 once. The second search maneuver SM2 may continue repeating the same cycle; vary some characteristic like the dimensions of the virtual geometric shape forming the second preconfigured deviation pattern P2; the forward distance traversed before reaching the next corner; or some combination thereof.

Figure 7C:
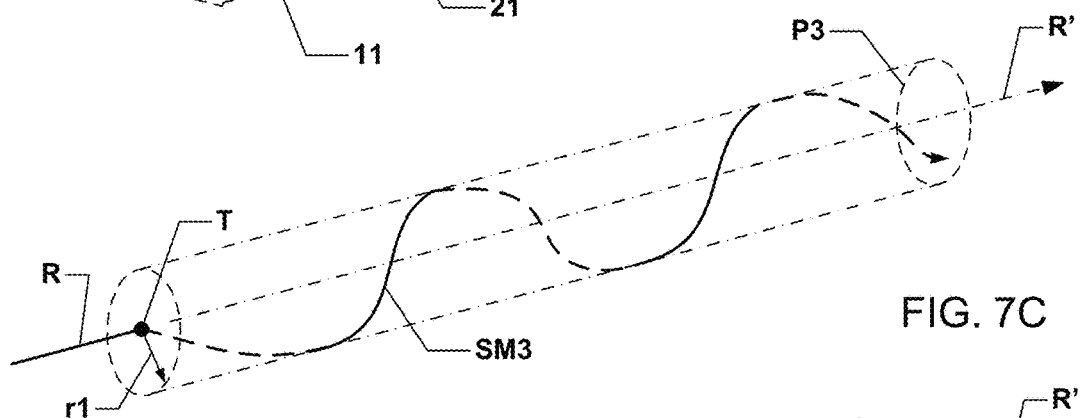

In FIG. 7C, the third preconfigured deviation pattern P3, included in a third search maneuver SM3, is a circle or cylindrical virtual geometric shape, the circumference of which is equidistant from the search maneuver vector R'. The third search maneuver SM3 incorporates the third preconfigured deviation pattern P3 by creating a winding route that follows the outer contour of a preconfigured deviation pattern P3 (i.e., the outside of the cylinder). In various embodiments, the third preconfigured deviation pattern P3 includes a constant radius r. One cycle around the perimeter of the preconfigured deviation pattern P3 may be considered one cycle of the third search maneuver SM3. The third search maneuver SM3 may continue repeating the same cycle; vary some characteristic like the dimensions of the virtual geometric shape forming the third preconfigured deviation pattern P3; the forward distance traversed before completing a cycle; or some combination thereof.

Figure 7D:
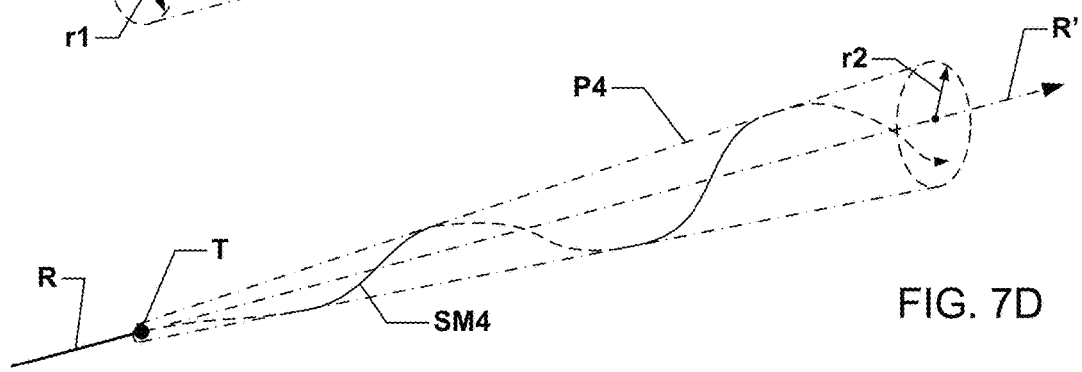

In FIG. 7D, the preconfigured deviation pattern P4, included in a fourth search maneuver SM4, is a conical virtual geometric shape, the circumference of increases but remains equidistant from the search maneuver vector R'. The fourth search maneuver SM4 incorporates the fourth preconfigured deviation pattern P4 by creating a spiraling route that winds in a continuous and gradually widening curve around a central axis coincident with the search maneuver vector R'. A radius r2 of the curve forming a cycle of the fourth search maneuver SM4 may increase at a fixed rate. The fourth search maneuver SM4 may continue with a fixed rate of change in the radial component; vary the rate of change; vary the forward distance traversed before completing a cycle; or some combination thereof.

Figure 7E:
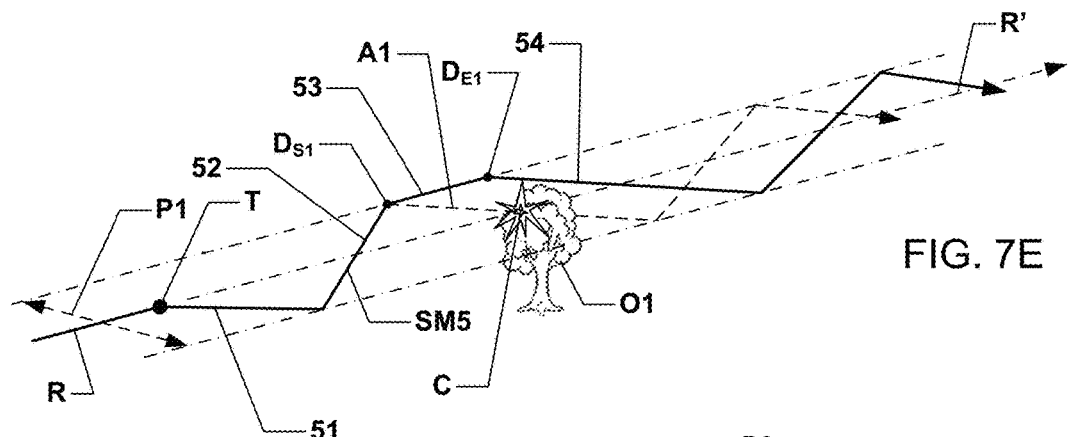

In FIG. 7E, the first preconfigured deviation pattern P1 is included in a fifth search maneuver SM5, which is a variation of the first search maneuver SM1. The fifth search maneuver SM5 not only applies the first preconfigured deviation pattern P1 to the search maneuver vector R', but also uses context data (e.g., 445) to avoid an obstacle O1 in the drone's path. According to various embodiments, an inference engine (e.g., 611) may use the context data to generate a search maneuver (e.g., 620), since the context data may not only locate the drone, but an approaching obstacle O1, such as a tree, building, other drone, or other obstacle. The inference engine may select the first preconfigured deviation pattern P1 for various reasons, such as suitability, best fit, or as a default, but add a minor variation from the first search maneuver SM1 in order to avoid a collision point C with the obstacle O1. In particular, although a first leg 51 and second leg 52 of the first search maneuver SM1 would not lead to a collision, an aborted leg A1 of the first search maneuver SM1 would lead to the collision C. Thus, the fifth search maneuver may include a third leg 53 that shifts the zigzag pattern of the first preconfigured deviation pattern P1 so that the fourth leg 54 and subsequent portions of the fifth search maneuver avoid the collision point C.

Figure 7F:
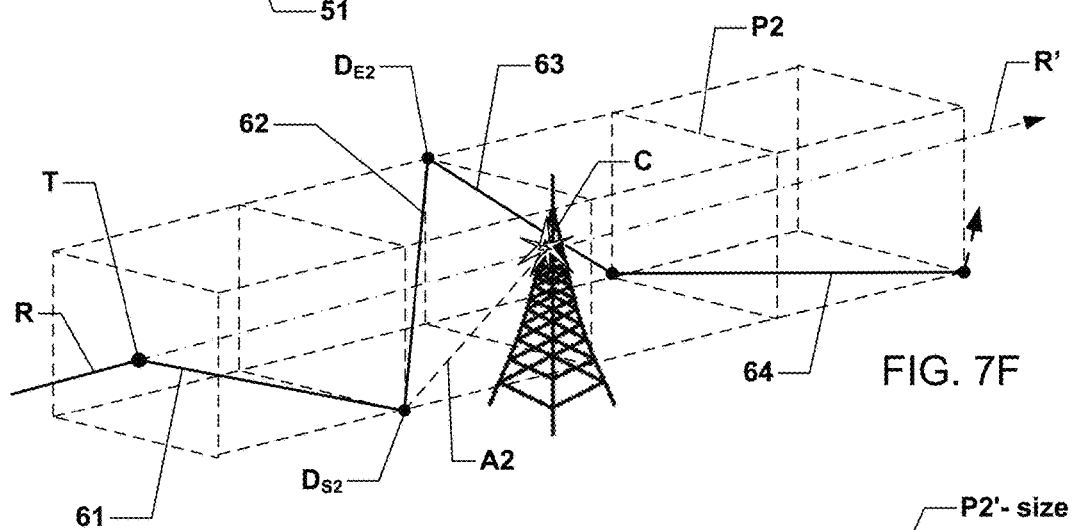

In FIG. 7F, the second preconfigured deviation pattern P2 is included in a sixth search maneuver SM6, which is a variation of the second search maneuver SM2. The sixth search maneuver SM6 not only applies the second preconfigured deviation pattern P2 to the search maneuver vector R', but also uses context data (e.g., 445) to avoid a different obstacle O2 in the drone's path. According to various embodiments, an inference engine (e.g., 611) may use the context data to generate a search maneuver (e.g., 620), since the context data may not only locate the drone, but the approaching obstacle O2, such as a communications tower. The inference engine may select the second preconfigured deviation pattern P2 for various reasons, and add a minor variation from the second search maneuver SM2 in order to avoid a collision point C with the obstacle O2. In particular, although a first leg 61 of the second search maneuver SM2 would not lead to a collision, an aborted leg A2 of the second search maneuver SM2 would lead to the collision C. Thus, the sixth search maneuver SM6 may include a second leg 62 that skips a next corner of the second preconfigured deviation pattern P2 so that the third leg 63, fourth leg 64 and subsequent portions of the sixth search maneuver avoid the collision point C.

Figure 7G:
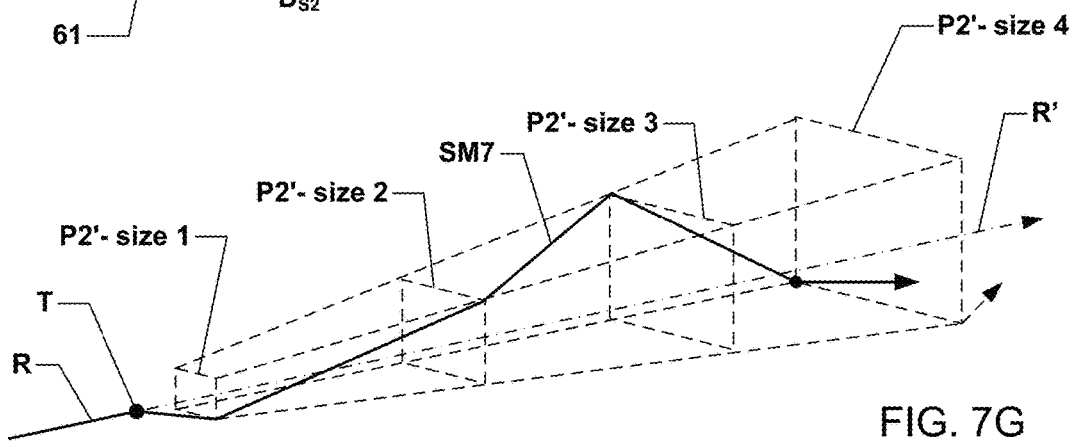
Figure 8:
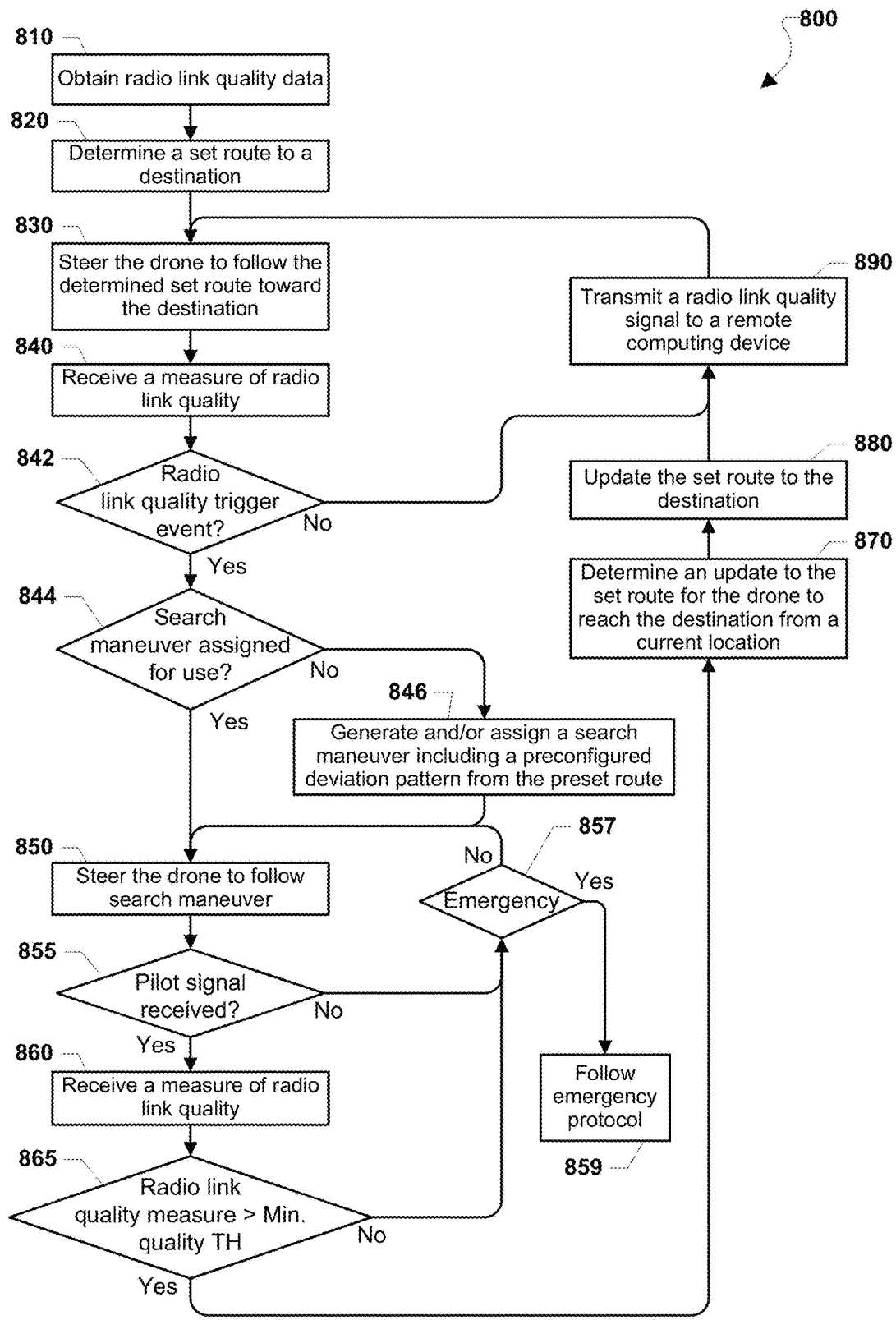
FIG. 8 is a process flow diagram illustrating a method for navigating a drone according to various embodiments.

In FIG. 7G, a changing second preconfigured deviation pattern P2' is included in a seventh search maneuver SM7, which is another variation of the second search maneuver SM2. The seventh search maneuver SM7 applies the second preconfigured deviation pattern P2 to the search maneuver vector R', but also steadily increases the dimensions (i.e., changes the size) of the second preconfigured deviation pattern P2 proportionate to the distance traveled in the direction of the search maneuver vector R'. In this way, the seventh search maneuver SM7 includes a path that steadily expands away from the search maneuver vector R'. In addition, to avoid running the drone into the ground during the lower segments of the seventh search maneuver SM7 as it expands, the bottom of the changing second preconfigured deviation pattern P2' may be kept a fixed distance to the search maneuver vector R' or at least a closer distance than the top of the changing second preconfigured deviation pattern P2'. According to various embodiments, an inference engine (e.g., 511) may use the context data to locate the drone relative to the ground. In this way, the inference engine may select this variation of the second preconfigured deviation pattern P2', and add a further variation from the second search maneuver SM2 in order to avoid ground interference or impact. FIG. 8 illustrates a method 800 of navigating a drone according to various embodiments. With reference to FIGS. 1-8, the operations of the method 800 may be performed by a processor (e.g., the processor 330 of the drone 300, the processor 392 of the ground station 390, or another remote computing device in communication with the drone).

In block 810, the processor may obtain radio link quality data corresponding to the regions in which WWAN communications have been recorded as being available. The radio link quality data may be obtained from a remote computing device (e.g., a server) maintaining a radio link quality database. In this way, the remote computing device may maintain the radio link quality database with updated and realistic measures of the radio link quality levels in various locations. The radio link quality data maintained in the database may be compiled from various devices, including drones (e.g., crowd sourcing) or other devices with a sensor for measuring radio link quality data.

Collection of radio link quality measurements by drones may increase the overall reliability of a communication network by constraining a set route to something less than all available regions. Drones may crowd-source network quality information enroute to a destination and report back to a centralized database that may compile an overall map of network quality measurements.

In block 820, the processor may use the obtained radio link quality data to determine a set route from a starting or current location to a destination so as to achieve a minimum or target level of wireless network connectivity. Determining the set route in block 820 may take into account the availability of WWAN communications as identified by the radio link quality data. Also, a set route may be determined that maximizes the availability of the WWAN communications. For example, the processor may figure out the best route by linking identified regions with the highest probability of maintaining WWAN communications. Alternatively, the processor may use a minimum threshold value for the probability of maintaining WWAN communications and select a shortest route that includes a region meeting the minimum threshold value for radio link quality. In determining the set route in block 820, the processor may use the radio link quality data in conjunction with other autonomous route planning considerations such as minimizing fuel expenditures, increasing or ensuring safety of the drone or a payload thereof, and other route planning criteria.

In block 830, the processor may steer the drone to follow the determined set route toward the destination. The steering of the drone may include navigation techniques that restrict the drone to a region that increases the operational availability and reliability of a network connection.

In block 840, the processor may receive a measure of radio link quality taken at a current location of the drone, whether stationary or enroute to the destination (e.g., 195, 295). The processor may receive the radio link quality measurement by actively accessing or passively obtaining the data from a memory or other source. Receiving the radio link quality may enable periodic reporting of measured radio link quality to a remote computing device, such as a server maintaining a radio link quality database. The radio link quality measurements may be collected by communication resources of a drone (e.g., the wireless transceiver 304 and antenna 306 of the drone 300) and either processed onboard the drone (e.g., by processor 330) or transmitted to a remote computing device (e.g., the processor 392 or other remote computing device) for processing. In various embodiments, the measurements may be obtained when the measure of radio link quality drop below a set level. Alternatively or additionally, the measurements may be obtained at regular intervals, when the measure of radio link quality is different than expected, when a remote command to do so is received by the drone, or at other intervals.

In various embodiments, the measure of radio link quality may be received in reference signals, which may use only a small fraction of the available spectrum resources, may be transmitted by base stations at known times and/or intervals. Such reference signals generally have a known structure, which a processor may use to estimate quality metrics, such as signal to noise ratio or received signal strength.

In determination block 842, the processor may determine whether a radio link quality trigger event associated with communications with the drone has occurred while the drone travels along a set route to a destination. Various embodiments use the method 500 for determining whether a radio link quality trigger event has occurred. The radio link quality trigger event may occur in response to a) a measure of radio link quality of communications with the drone dropping below a radio link quality threshold; b) the radio link quality of communications being below the radio link quality threshold longer than a predetermined period; c) a radio link quality deterioration rate exceeding a deterioration rate threshold; and/or d) the radio link quality deterioration rate exceeding a deterioration rate threshold longer than a predetermined period.

In response to determining that a radio link quality trigger event has not occurred (i.e., determination block 842="No"), the processor may transmit (i.e., via the wireless transceiver 304 and antenna 306) a radio link quality signal, including a value representing the measured radio link quality, to a remote computing device in block 890. During or after the transmission of the radio link quality signal the processor may steer the drone to continue to follow the determined set route toward the destination in block 830 of the method 800.

In response to determining that the radio link quality trigger event has occurred (i.e., determination block 842="Yes"), the processor may determine, in determination block 844, whether a search maneuver is assigned for use by the drone to improve the radio link quality.

The assignment of a particular search maneuver for use by the drone may be reflected in a register accessible by the processor (e.g., 330). If no assignment has been made or a previous assignment has been revoked, the register may reflect no assignment. Thus, in determination block 844 the processor may check the register to determine whether a search maneuver has been assigned.

In response to determining that a search maneuver is assigned for improving the radio link quality (i.e., determination block 844="Yes"), the processor may steer the drone to follow the assigned search maneuver in block 850. In response to determining that a search maneuver is not assigned (i.e., determination block 844="No"), the processor may generate and/or assign a search maneuver, including a preconfigured deviation pattern from the set route of the drone, in block 846.

A processor of the drone may include and/or use an optimization module for generating the search maneuver. In this way, preconfigured deviation patterns may be modified by variables, such as how large the initial circuit should be, how the pattern may change over time (e.g., with each iteration, how much to increase/decrease the size of the pattern), object/obstacle avoidance (either using real-time sensing or stored information); available power levels (i.e., operating time, which may trigger auto-land procedures), other similar features, or combinations thereof. In block 850, the processor may steer the drone to follow the assigned search maneuver (i.e., either determined in block 846 or previously determined, stored and accessible from memory). The steering of the drone may include navigation techniques that restrict the drone to a region that increases the likelihood of establishing operational availability and reliability of a network connection.

In determination block 855, the processor may determine whether a pilot signal is received. The determination as to whether the pilot signal is received may occur at any time during the search maneuver. Also, the processor may require different levels of radio link quality before concluding that the pilot signal is received. For example, reception of the pilot signal may occur as soon as the processor can demodulate a detected pilot signal or when a predetermined data transfer rate is available for a detected pilot signal.

In response to determining that pilot signal is received (i.e., determination block 855="Yes"), the processor may receive a measure of radio link quality in block 860. The reception of the measure of radio link quality in block 860 may be the same or similar to that performed in block 840.

In response to determining that pilot signal is not received (i.e., determination block 855="No"), the processor may determine whether the drone is in an emergency state in determination block 857. An emergency state may be determined in connection with the drone running critically low on power or some other condition requiring the drone to discontinue navigation toward the destination (e.g., block 830).

In response to determining the drone is in an emergency state (i.e., determination block 857="Yes"), the processor may follow an emergency protocol in block 859. An emergency protocol may include an immediate landing, a change in destination, or other procedure.

In response to determining the drone is not in an emergency state (i.e., determination block 857="No"), the processor may further steer the drone to follow the search maneuver in block 850

In determination block 865, the processor may determine whether the measure of radio link quality received in block 860 exceeds a minimum radio link quality threshold value (i.e., Min. quality TH). The determination as to whether the measure of radio link quality exceeds a minimum radio link quality threshold value in determination block 865 may be the same or similar to that performed in determination block 515 in the method 500.

In response to determining that the measure of radio link quality received in block 860 exceeds a minimum radio link quality threshold value (i.e., determination block 865="Yes"), the processor may determine an update to the set route for the drone to reach the destination from a current location in block 870.

In response to determining that the measure of radio link quality received in block 860 does not exceed a minimum radio link quality threshold value (i.e., determination block 865="No"), the processor may determine whether the drone is in an emergency state in determination block 857.

In block 880, the processor may update the set route to the destination. Once the set route is updated, the processor may transmit a radio link quality signal to a remote computing device in block 890 and again steer the drone to follow the determined (and now updated) set route toward the destination in block 830.

The various processors described herein may be any programmable microprocessor, microcomputer or multiple processor chip or chips that can be configured by software instructions (applications) to perform a variety of functions, including the functions of various embodiments described herein. In the various devices, multiple processors may be provided, such as one processor dedicated to wireless communication functions and one processor dedicated to running other applications. Typically, software applications may be stored in internal memory before they are accessed and loaded into the processors. The processors may include internal memory sufficient to store the application software instructions. In many devices, the internal memory may be a volatile or nonvolatile memory, such as flash memory, or a mixture of both. For the purposes of this description, a general reference to memory refers to memory accessible by the processors including internal memory or removable memory plugged into the various devices and memory within the processors.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The foregoing method descriptions and the process flow diagrams are provided merely as illustrative examples and are not intended to require or imply that the steps of various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described generally in terms of functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present claims.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in processor-executable software, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include random access memory (RAM), read only memory (ROM), electrically erasable programmable ROM (EEPROM), FLASH memory, compact disc ROM (CD-ROM) or other optical disk storage, magnetic disk storage or other magnetic storage smart objects, or any other medium that may be used to store desired program code in the form of instructions or data structures and that may be accessed by a computer. Disk and disc, as used herein, includes CD, laser disc, optical disc, digital versatile disc (DVD), floppy disk, and Blu-ray disc where disks usually reproduce data magnetically, while discs reproduce data optically with lasers. Combinations of memory described herein are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to some embodiments without departing from the scope of the claims. Thus, the claims are not intended to be limited to the embodiments shown herein but are to be accorded the widest scope consistent with the language of the claims and the principles and novel features disclosed herein.

What is claimed is:

1. A method of navigating a drone, comprising:
determining, by a processor of the drone, whether a radio link quality trigger event associated with communications with the drone has occurred while the drone travels along a set route to a destination, wherein the radio link quality trigger event corresponds to predetermined characteristics of radio link quality; and
steering the drone autonomously by the processor to follow a search maneuver for finding regions with improved radio link quality in response to determining the radio link quality trigger event has occurred, wherein the search maneuver follows a preconfigured deviation pattern that is configured before determining whether the radio link quality trigger event has occurred and departs from the set route.

2. The method of claim 1, wherein the search maneuver is determined independent of radio link quality information.

3. The method of claim 1, wherein the search maneuver is not configured to direct the drone to a known location.

4. The method of claim 1, further comprising:
determining, by the processor, whether any search maneuver is assigned for immediate use by the drone; and
determining, by the processor, a set of movements for use as the search maneuver in response to determining that no search maneuver is assigned for immediate use, wherein steering the drone to follow the search maneuver uses the determined set of movements.

5. The method of claim 1, further comprising determining, by the processor, whether a set of movements are assigned for immediate use by the drone as the search maneuver, wherein steering the drone to follow the search maneuver using the assigned set of movements is performed in response to determining that the set of movements are assigned for immediate use by the drone.

6. The method of claim 1, wherein the preconfigured deviation pattern includes at least one movement characteristic selected from patterns that include at least one of a spiral, a geometric shape, a change in elevation, maintaining a fixed elevation, movement at least partially in a direction of the set route, and a combination thereof.

7. The method of claim 1, wherein the preconfigured deviation pattern constrains the drone to a region in which WWAN communications are expected to meet a minimum standard of radio link quality.

8. The method of claim 1, wherein the search maneuver comprises a modified version of the preconfigured deviation pattern that takes into account at least one of a size of an initial cycle of the preconfigured deviation pattern, a change in the size of the initial cycle for one or more subsequent cycles of the preconfigured deviation pattern, a change in a movement characteristic of the preconfigured deviation pattern, avoidance of an object or obstacle, navigational restrictions, or an available power level of the drone.

9. The method of claim 1, wherein the search maneuver comprises a modified version of the preconfigured deviation pattern that takes into account a detected radio link obstruction interfering with a radio link quality of communications with the drone, wherein the modified version of the preconfigured deviation pattern is directed away from the detected radio link obstruction.

10. The method of claim 1, wherein the radio link quality trigger event comprises a measure of radio link quality of communications with the drone dropping below a radio link quality threshold.

11. The method of claim 10, wherein the radio link quality trigger event further comprises the measure of radio link quality remaining below the radio link quality threshold longer than a low quality timeout threshold.

12. The method of claim 1, wherein the radio link quality trigger event comprises a measure of radio link quality of communications with the drone indicating a radio link failure longer than a radio link failure timeout threshold.

13. The method of claim 1, wherein the radio link quality trigger event comprises a radio link quality deterioration rate exceeding a deterioration rate threshold.

14. The method of claim 1, further comprising:
determining whether a detected pilot signal can be demodulated in response to steering the drone to follow the determined search maneuver.

15. The method of claim 1, further comprising:
determining whether a predetermined data transfer rate is available for a detected pilot signal in response to steering the drone to follow the determined search maneuver.

16. The method of claim 1, further comprising:
obtaining radio link quality data corresponding to a region in which wide area network (WWAN) communications are available;
determining the set route to the destination using the obtained radio link quality data that will result in the drone passing through the region in which WWAN communications can be maintained; and
steering the drone to follow the determined set route toward the destination.

17. The method of claim 16, wherein determining the set route uses the obtained radio link quality data to ensure the set route provides a defined minimum likelihood that WWAN communications will be maintained while traversing the set route.

18. The method of claim 16, wherein obtaining radio link quality data comprises obtaining the radio link quality data from at least one other drone that previously occupied the region.

19. The method of claim 1, further comprising:
receive a measure of a radio link quality taken at a location of the drone; and
transmitting a radio link quality report including the measured of the radio link quality to a remote computing device.

20. The method of claim 19, further comprising repeating operations of receiving the radio link quality and the transmitting of the radio link quality report periodically enroute to the destination.

21. The method of claim 19, wherein transmitting the radio link quality report is performed in response to determining that the radio link quality measured at the location of the drone exceeds a minimum radio link quality threshold value.

22. The method of claim 1, further comprising:
determining whether a pilot signal is received for communications with the drone in response to steering the drone to follow the determined search maneuver;
determining an update to the set route for reaching the destination from a current location of the drone in response to determining that the pilot signal is received; and steering the drone to follow the updated set route toward the destination.

23. The method of claim 22, wherein the update to the set route for reaching the destination directs the drone to pass through a region in which WWAN communications are expected to be available.

24. A drone comprising:
a wireless transceiver configured to send and receive wireless communication signals; and
a processor coupled to the wireless transceiver and configured with processor-executable instructions to:
determine whether a radio link quality trigger event associated with communications with the drone has occurred while the drone travels along a set route to a destination, wherein the radio link quality trigger event corresponds to predetermined characteristics of radio link quality; and
steer the drone autonomously by the processor to follow a search maneuver for finding regions with improved radio link quality in response to determining the radio link quality trigger event has occurred, wherein the search maneuver follows a preconfigured deviation pattern that is configured before determining whether the radio link quality trigger event has occurred and departs from the set route.

25. The drone of claim 24, wherein the processor is further configured with processor-executable instructions to:
determine whether any search maneuver is assigned for immediate use by the drone; and
determine a set of movements for use as the search maneuver in response to determining no search maneuver is assigned for immediate use,
wherein the processor is further configured with processor-executable instructions to steer the drone to follow the search maneuver using the determined set of movements.

26. The drone of claim 24, wherein the processor is further configured with processor-executable instructions to determine whether a set of movements are assigned for immediate use by the drone as the search maneuver,
wherein the processor is further configured with processor-executable instructions to steer the drone to follow the search maneuver using the assigned set of movements in response to determining that the set of movements are assigned for immediate use by the drone.

27. The drone of claim 24, wherein the processor is further configured with the processor-executable instructions such that the preconfigured deviation pattern includes at least one movement characteristic selected from patterns that include at least one of a spiral, a geometric shape, a change in elevation, maintaining a fixed elevation, movement at least partially in a direction of the set route, and a combination thereof.

28. The drone of claim 24, wherein the processor is further configured with the processor-executable instructions such that the search maneuver comprises a modified version of the preconfigured deviation pattern that takes into account at least one of a size of an initial cycle of the preconfigured deviation pattern, a change in the size of the initial cycle for one or more subsequent cycles of the preconfigured deviation pattern, a change in a movement characteristic of the preconfigured deviation pattern, avoidance of an object or obstacle, navigational restrictions, or an available power level of the drone.

29. A drone, comprising:
means for determining whether a radio link quality trigger event associated with communications with the drone has occurred while the drone travels along a set route to a destination, wherein the radio link quality trigger event corresponds to predetermined characteristics of radio link quality; and
means for steering the drone autonomously to follow a search maneuver for finding regions with improved radio link quality in response to determining the radio link quality trigger event has occurred, wherein the search maneuver follows a preconfigured deviation pattern that is configured before determining whether the radio link quality trigger event has occurred and departs from the set route.

30. A non-transitory processor-readable storage medium having stored thereon processor-executable instructions configured to cause a processor of a drone to perform operations comprising:
determining whether a radio link quality trigger event associated with communications with the drone has occurred while the drone travels along a set route to a destination, wherein the radio link quality trigger event corresponds to predetermined characteristics of radio link quality; and
steering the drone autonomously by the processor to follow a search maneuver for finding regions with improved radio link quality in response to determining the radio link quality trigger event has occurred, wherein the search maneuver follows a preconfigured deviation pattern that is configured before determining whether the radio link quality trigger event has occurred and departs from the set route.

* * * * *